(12) United States Patent
Sone

(10) Patent No.: US 7,392,227 B2
(45) Date of Patent: Jun. 24, 2008

(54) PREPAID AVAILABLE NUMBER-OF-TIMES-OF-UNITARY-USE STORAGE MEDIUM FOR MAKING USE OF PAY SERVICES, INITIAL VALUE-SETTING SYSTEM AND DEVICE, AND OPERATING SYSTEM

(76) Inventor: Yasuhito Sone, 468-1, Oazatakuma, Takuma-cho, Mitoyo-gun, Kagawa (JP) 769-1101

( * ) Notice: Subject to any disclaimer, the term of this patent is extended or adjusted under 35 U.S.C. 154(b) by 1047 days.

(21) Appl. No.: 09/868,619

(22) PCT Filed: Mar. 3, 2001

(86) PCT No.: PCT/JP01/01992

§ 371 (c)(1),
(2), (4) Date: Sep. 25, 2001

(87) PCT Pub. No.: WO01/69476

PCT Pub. Date: Sep. 20, 2001

(65) Prior Publication Data

US 2002/0178050 A1    Nov. 28, 2002

(30) Foreign Application Priority Data

Mar. 14, 2000   (JP) .............................. 2000-069632

(51) Int. Cl.
*G06F 17/00* (2006.01)
*G06G 7/00* (2006.01)
*G07B 15/00* (2006.01)
*G07B 15/02* (2006.01)

(52) U.S. Cl. .............................. 705/400; 705/13; 705/14

(58) Field of Classification Search .................... 705/13, 705/14, 400, 417, 418
See application file for complete search history.

(56) References Cited

U.S. PATENT DOCUMENTS 5,144,553 A * 9/1992 Hassett et al. .................. 705/13
5,819,234 A * 10/1998 Slavin et al. ................ 340/10.4
6,091,344 A * 7/2000 Park et al. .................... 340/928

(Continued)

FOREIGN PATENT DOCUMENTS

FR    0380434 A1 * 1/1990

(Continued)

*Primary Examiner*—John W. Hayes
*Assistant Examiner*—Fadey S. Jabr

(57) ABSTRACT

An initial value-setting system (10) for setting the initial available numbers of times of unitary use (P) of prepaid available number-of-times-of-unitary-use storage media (8) for making use of a certain toll or pay service, the initial value-setting system (10) comprising a means for receiving purchase-application data on each medium (8) including its purchase date and time (DT) through a communication network (N), a storage area for storing the opening date and time (DTS) of advance sale of the media (8), a storage area for storing the closing date and time (DTO) of the advance sale, a storage area for storing the closing date and time (DTE) of ordinary sale, as distinct from the advance sale, of the media (8), and an initial value-setting means for setting the initial numbers (P) of media (8) with purchase dates and times (DT) between the opening and closing dates and times (DTS and DTO) higher than those (P) of media (8) with purchase dates and times (DT) between the closing dates and times (DTO and DTE).

8 Claims, 24 Drawing Sheets

U.S. PATENT DOCUMENTS

| | | | |
|---|---|---|---|
| 6,388,581 B1 * | 5/2002 | Barker et al. | 340/928 |
| 6,396,418 B2 * | 5/2002 | Naito | 340/928 |
| 6,611,811 B1 * | 8/2003 | Deaton et al. | 705/14 |
| 2001/0047296 A1 * | 11/2001 | Wyker | 705/14 |

FOREIGN PATENT DOCUMENTS

| | | | |
|---|---|---|---|
| JP | 61-42086 | | 2/1986 |
| JP | 5182068 | * | 7/1993 |
| JP | 10-143683 | | 5/1998 |
| JP | 11-224313 | | 8/1999 |
| JP | 11259737 A | * | 9/1999 |
| JP | 11266330 A | * | 9/1999 |

\* cited by examiner

PREPAID AVAILABLE NUMBER-OF-TIMES-OF-UNITARY-USE STORAGE MEDIUM FOR MAKING USE OF PAY SERVICES, INITIAL VALUE-SETTING SYSTEM AND DEVICE, AND OPERATING SYSTEM

This invention relates to a prepaid available number-of-times-of-unitary-use storage medium, a system and a device to set the initial value of the medium, and an operating system of the medium.

When we use toll facilities such as toll roads or bridges or make use of other pay services, the highway or bridge public corporations or the service providers charge us tolls to recover their investments.

There are, however, the following problems in collecting such tolls and charges from users.

(i) Every time a user uses, for example, a toll road, he pays its toll at its tollgate. In other words, the public corporation of the road cannot recover the construction and maintenance costs of the road unless drivers use the road. The public corporation collects a toll every time each driver uses the road; therefore it takes a long time for the toll income to build up to a certain level.

(ii) If the toll is set too high, few drivers use the road, the public corporation collecting little money. If the public corporation merely lowers the toll to increase the traffic, traffic will increase with drivers reaping the benefit, but it is unknown to the public corporation whether the increase in the number of drivers will more than make up the lost income by the reduction of the toll.

According to the first feature of the invention, there is provided an initial value-setting system which sets the initial available numbers of times of unitary use P of prepaid available number-of-times-of-unitary-use storage media for making use of a certain toll or pay service. The initial value-setting system comprises a means for receiving purchase-application data on each storage medium including its purchase date and time DT through a communication network, a storage area for storing the opening date and time DTS of advance sale of the storage media, a storage area for storing the closing date and time DTO of the advance sale, a storage area for storing the closing date and time DTE of ordinary sale, as distinct from the advance sale, of the storage media, and an initial value-setting means for setting the initial numbers P of storage media with purchase dates and times DT between the opening and closing dates and times DTS and DTO higher than those P of storage media with purchase dates and times DT between the closing dates and times DTO and DTE.

According to the second feature of the invention, there is provided an initial value-setting system as according to the first feature of which the initial value-setting means sets the initial numbers P of storage media with purchase dates and times DT between the closing dates and times DTO and DTE in a way such that the earlier the purchase dates and times DT of the storage media are, the larger the initial numbers P of the storage media are.

According to the third feature of the invention, there is provided an initial value-setting system as according to the first feature of which the initial value-setting means sets one and the same number P for all storage media with purchase dates and times DT between the opening and closing dates and times DTS and DTO.

According to the fourth feature of the invention, there is provided an initial value-setting system as according to the first, second, or third feature. The initial value-setting system includes a storage area for storing a target annual sales Z of the storage media, a storage area for storing a selling price K of the storage media, a storage area for storing a toll $E_0$ expressed in a number of times of unitary use of the service, a storage area for storing a most preferential initial number of times of unitary use A applicable to storage media purchased during the advance sale, and a storage area for storing the sales YT from the opening date and time DTS to the purchase date and time DT of each storage medium. The initial value-setting means has a function $f_1(DT)$ to calculate the number of days C from the closing date and time DTO to the purchase date and time DT of each storage media, a function $f_2(C, A, E_0)$ to calculate a preferential initial number of times of unitary use m at the purchase date and time DT of said medium based on the number of days C, the most preferential initial number of times of unitary use A, and the toll $E_0$, a function $f_3(m, Z)$ to calculate the ratio X of the preferential initial number of times of unitary use m of said storage medium to the target annual sales Z of the storage media, and a function $f_4(X, YT)$ to calculate the final initial number of times of unitary use P for said storage medium based on the ratio X and the sales YT at the purchase date and time DT of said storage medium.

According to the fifth feature of the invention, there is provided an initial value-setting device which is a computer and provided with the initial value-setting system according to claim 1, 2, 3, or 4.

According to the sixth feature of the invention, there is provided an operating system of prepaid available number-of-times-of-unitary-use storage media for making use of a certain toll or pay service. The operating system comprises the initial value-setting device according to claim 5 which sets the initial available numbers of times of unitary use P of the prepaid available number-of-times-of-unitary-use storage media and has a means for transmitting the initial numbers P, purchase-application-data input devices each to input and transmit purchase-application data on each prepaid available number-of-times-of-unitary-use storage medium to the initial value-setting device through a communication network, writing devices each to receive the initial number P of each storage medium from the initial value-setting device through the communication network and write the initial number P in said storage medium, and rewriting devices each to rewrite the remaining available number of times of unitary use of said user's storage medium every time each user makes use of the service.

According to the seventh feature of the invention, there is provided an operating system of prepaid available number-of-times-of-unitary-use storage media for making use of a certain toll or pay service. The operating system comprises (i) the initial value-setting device according to claim 5 which sets the initial numbers of times of unitary use P of the storage media and has a means for transmitting the initial numbers P, (ii) mobile communication terminals each including a means for inputting purchase-application data on a storage medium, a means for transmitting the purchase-application data on the storage medium to the initial value-setting device through a communication network, a means for receiving the initial number P of the storage medium from the initial value-setting device through the communication network, and a means for writing the initial number P in the storage medium, and (iii) a rewriting device to rewrite the remaining available number of times of unitary use of said user's storage medium every time each user uses the service.

According to the eighth feature of the invention, there is provided an operating system of prepaid available number-of-times-of-unitary-use storage media for making use of a certain toll or pay service. The operating system comprises (i)

the initial value-setting device according to claim 5 which sets the initial numbers of times of unitary use P of the storage media and has a means for transmitting the initial numbers P, (ii) information-processing terminals each including a means for inputting purchase-application data on a storage medium, a means for transmitting the purchase-application data on the storage medium to the initial value-setting device through a communication network, a means for receiving the initial number P of the storage medium from the initial value-setting device through the communication network, and a means for writing the initial number P in the storage medium, and (iii) a rewriting device 4 to rewrite the remaining available number of times of unitary use of said user's storage medium every time each user makes use of the service.

According to the ninth feature of the invention, there is provided a prepaid available number-of-times-of-unitary-use storage medium for making use of a certain toll or pay service which is a storage medium to be used in the operating system according to claim 6, 7, or 8 and has a rewritable storage area of a number of times of unitary use.

Figure 1:
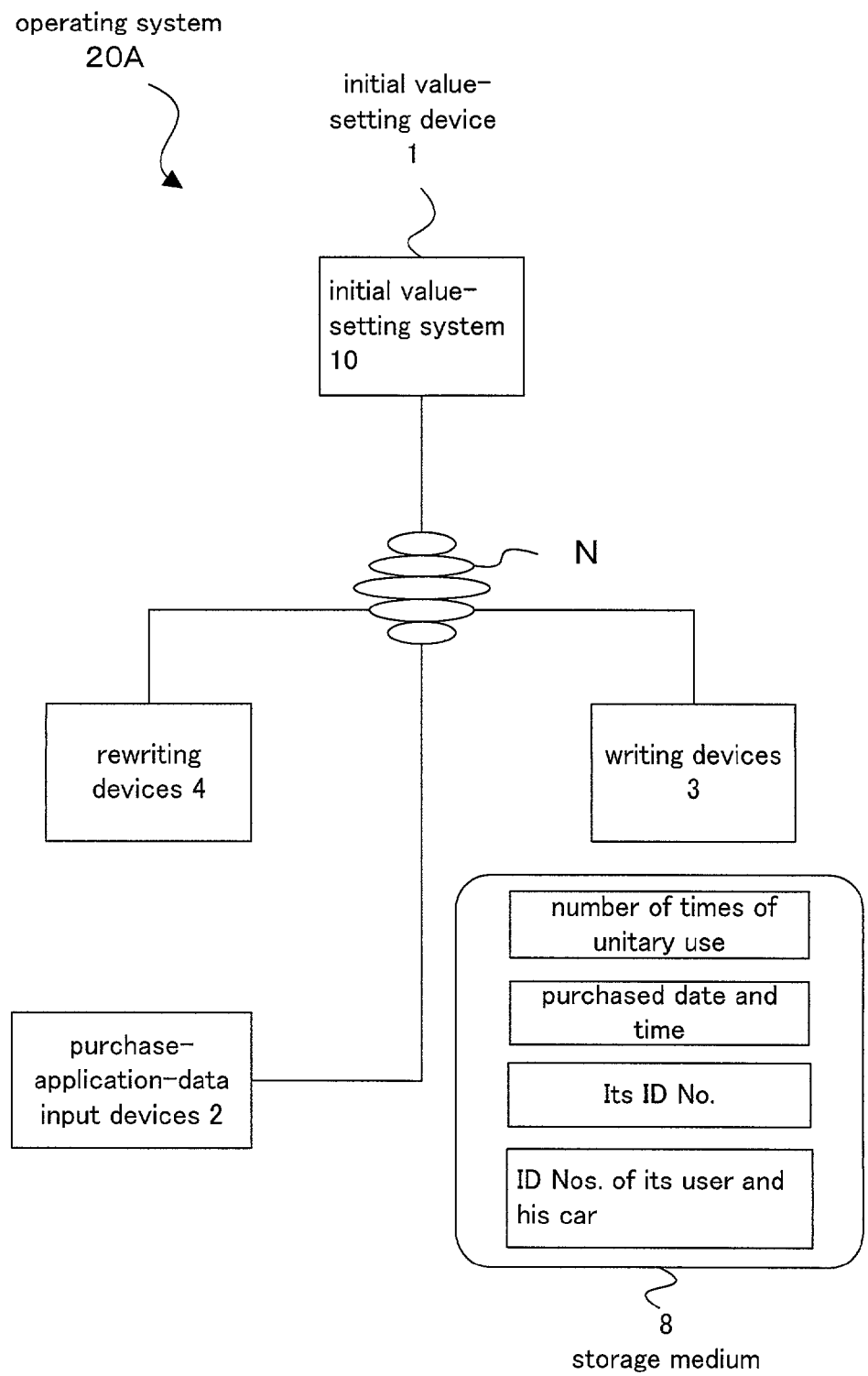
FIG. 1 shows a schematic block diagram of a first embodiment of operating system and a configuration of an embodiment of prepaid available number-of-times-of-unitary-use storage medium in accordance with the invention.

Now, referring to the drawings, the first embodiment of operating system 20A of prepaid available number-of-times-of-unitary-use storage media 8 will be described.

As shown in FIG. 1, the operating system 20A is to operate, process, and manage prepaid available number-of-times-of-unitary-use storage media 8 for making use of a certain service.

The word of "services" used in this specification includes services offered by bridges, roads, tunnels, airliners, ships, trains, buses, taxis, trucks, travel agents, means of telecommunication, service providers in the field of information technology, radio and TV broadcasting, amusement facilities, halls, theaters, recreational facilities, amusement parks, golf courses, athletic facilities, accommodations (hotel facilities), educational facilities, monetary and insurance facilities, zoos, and so on.

It will do if the prepaid available number-of-times-of-unitary-use storage medium 8 has, at the least, a storage area to store the number of times of unitary use; accordingly the following storage media can be used as the storage medium 8: magnetic cards such as telephone card, prepaid card, and cash card, magnetic tape, memory card, IC card, magnetic disk, floppy disk, hard disk, zip disk, optical magnetic disk, silicon disk, optical disk, photo-disk, CD-R, CD-RW, DVD-R, DVD-RAM, DVD-RW, DVD+RW, and so on.

As shown in FIG. 1, apart from the storage area to store the number of times of unitary use, the storage medium 8 described below has storage areas to store its ID No., its purchased date and time, and ID Nos. of its user, his car, etc.

Stored in the storage area, "ID No. of Storage Medium," is the number to identify the storage medium 8 itself.

Stored in the storage area, "Purchasing Date and Time," is the date of the user's purchasing the storage medium 8.

Stored in the storage area, "ID Nos. of User, Car, etc.," are the ID Nos. of the user, his car, etc.

The storage area, "ID Nos. of User, Car, etc.," is dispensable.

As shown in FIG. 1, the operating system 20A comprises a device for setting the initial available number of times of unitary use for each prepaid available number-of-times-of-unitary-use storage medium 8 (hereinafter referred to as "initial value-setting device 1"), devices for inputting data on each user for a storage medium 8 (hereinafter referred to as "purchase-application-data input devices 2"), devices for writing data in storage media 8 (hereinafter referred to as "writing devices 3"), and devices for rewriting the numbers of times of unitary use stored in storage media 8 (hereinafter referred to as "rewriting devices 4").

The initial value-setting device 1 will be described first.

The initial value-setting device 1 is a computer, which is connected to a communication network N such as a telephone line or a private line so as to transmit and receive data. Installed in the initial value-setting device 1 is a system 10 to set the initial available number of times of unitary use of each storage medium 8 (hereinafter referred to as "initial value-setting system 10"), which will be described in detail later.

The purchase-application-data input devices 2 will be described next.

The purchase-application-data input devices 2 are connected to the communication network N so as to transmit data to the network N. Data on each user for a storage medium 8 are inputted through a purchase-application-data input device 2 and transmitted to the initial value-setting device 1 through the communication network N.

The writing devices 3 are connected to the communication network N so as to receive data from the network N. The writing devices 3 are to receive the initial available numbers of times of unitary use of storage media 8 from the initial value-setting device 1 through the communication network N and write the numbers in the storage media 8.

The rewriting devices 4 are connected to the communication network N so as to transmit data to the network N. Every time each user makes use of the service offered by, for example, a toll bridge, a rewriting device 4 at the toll gate rewrites the number of times of unitary use stored in the storage medium 8 of said user.

The rewriting devices 4 need not be connected to the communication network N.

Figure 2:
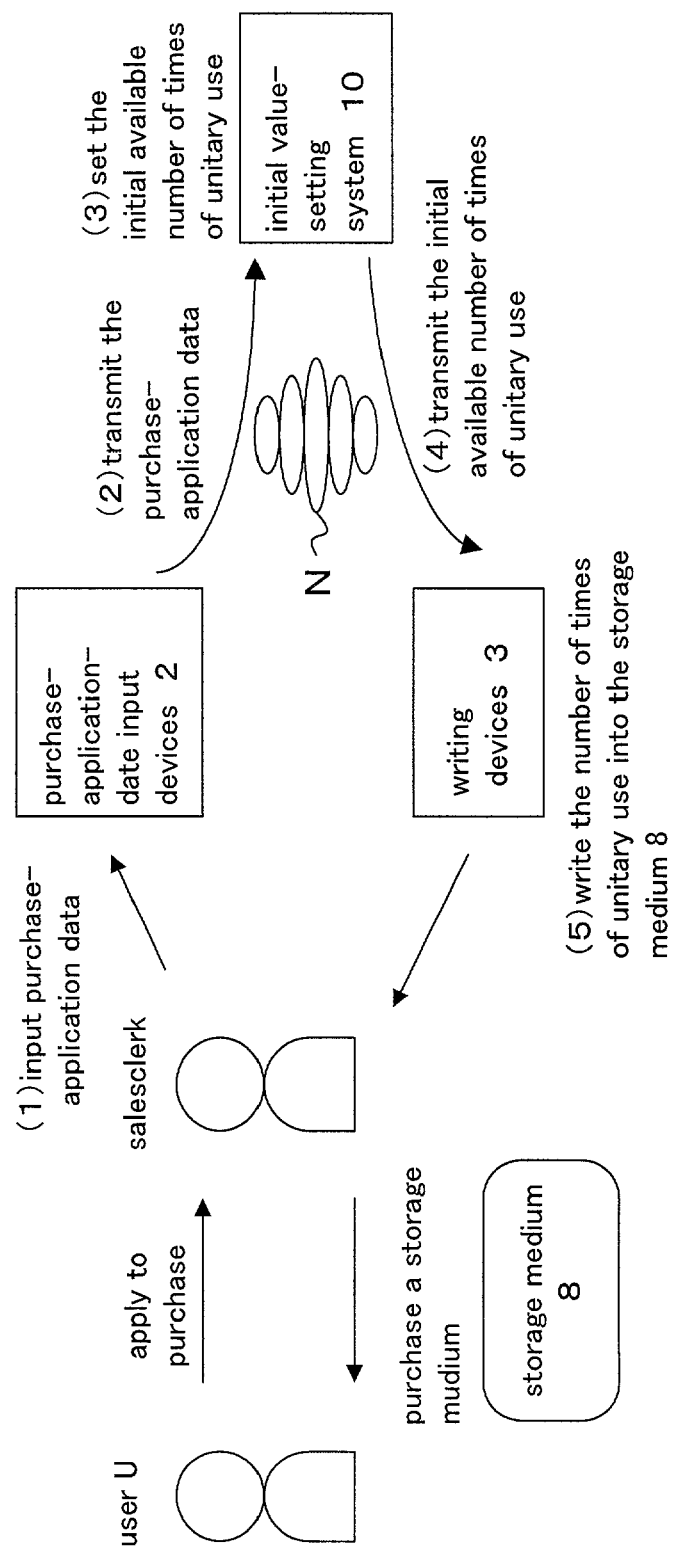
FIG. 2 shows a data flow in the operating system of FIG. 1.
Figure 3:
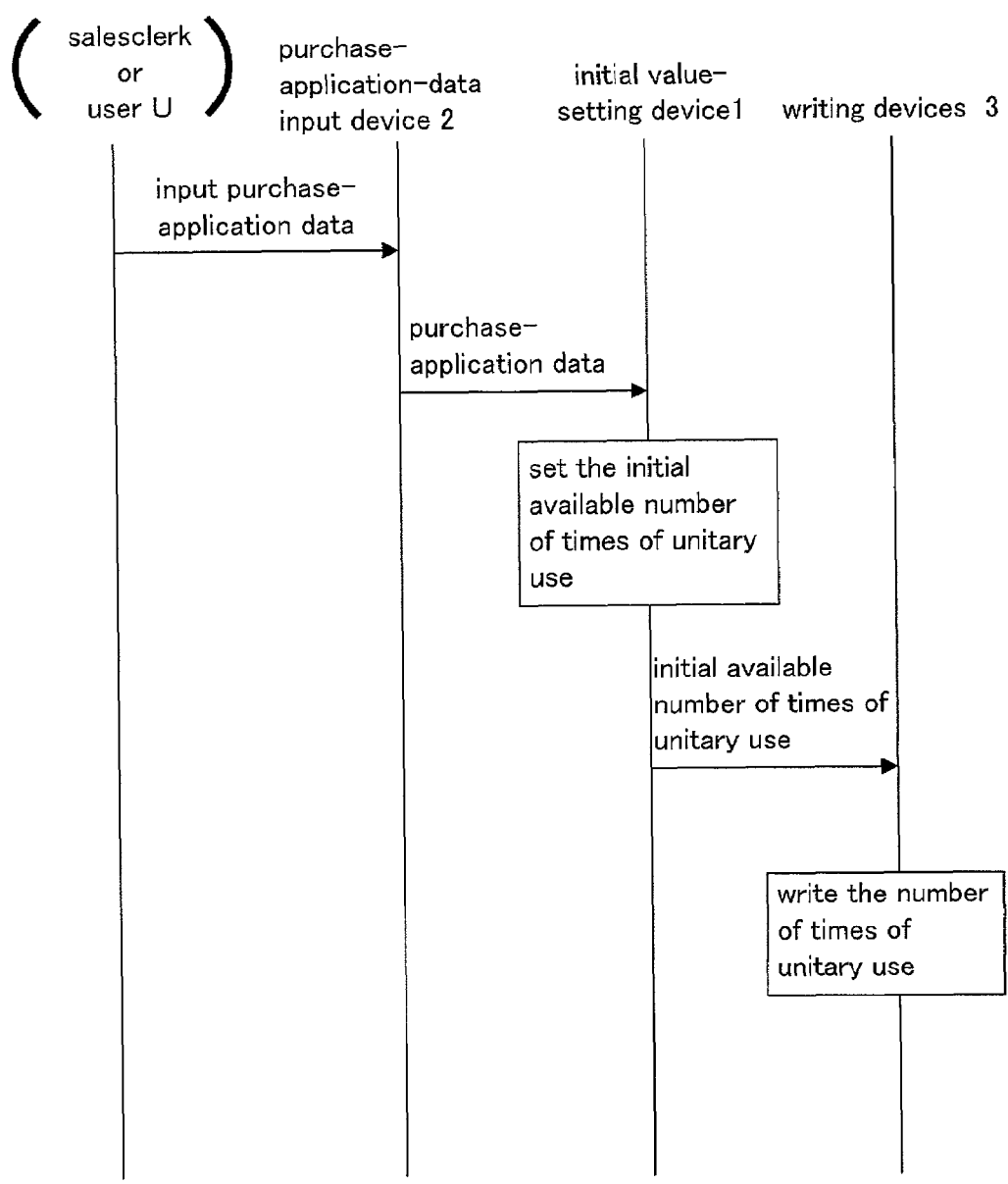
FIG. 3 shows a sequence of events in the operating system of FIG. 1.

As shown in FIGS. 2 and 3, when an user U applies to a salesclerk for a storage medium 8, the salesclerk inputs the purchase-application data such as the date of sale and user-identifying data including the user's name and telephone number into a purchase-application-data input device 2.

Then the purchase-application data are transmitted from the purchase-application-data input device 2 to the initial value-setting device 1. The initial value-setting system 10 in the initial value-setting device 1 sets the initial available number of times of unitary use of the storage medium 8 and transmits it to a writing device 3. The writing device 3 writes the number of times into the storage medium 8, which the salesclerk hands over to the user.

Although it is preferable to sell all storage media 8 for a certain service at one and the same price K, the price of a certain number of times of unitary use may be fixed (for example, ¥250 per 1,000 times of unitary use) to sell storage media 8 at different prices (for example, a storage medium 8 of 4,000 times of unitary use for ¥1,000).

Figure 4:
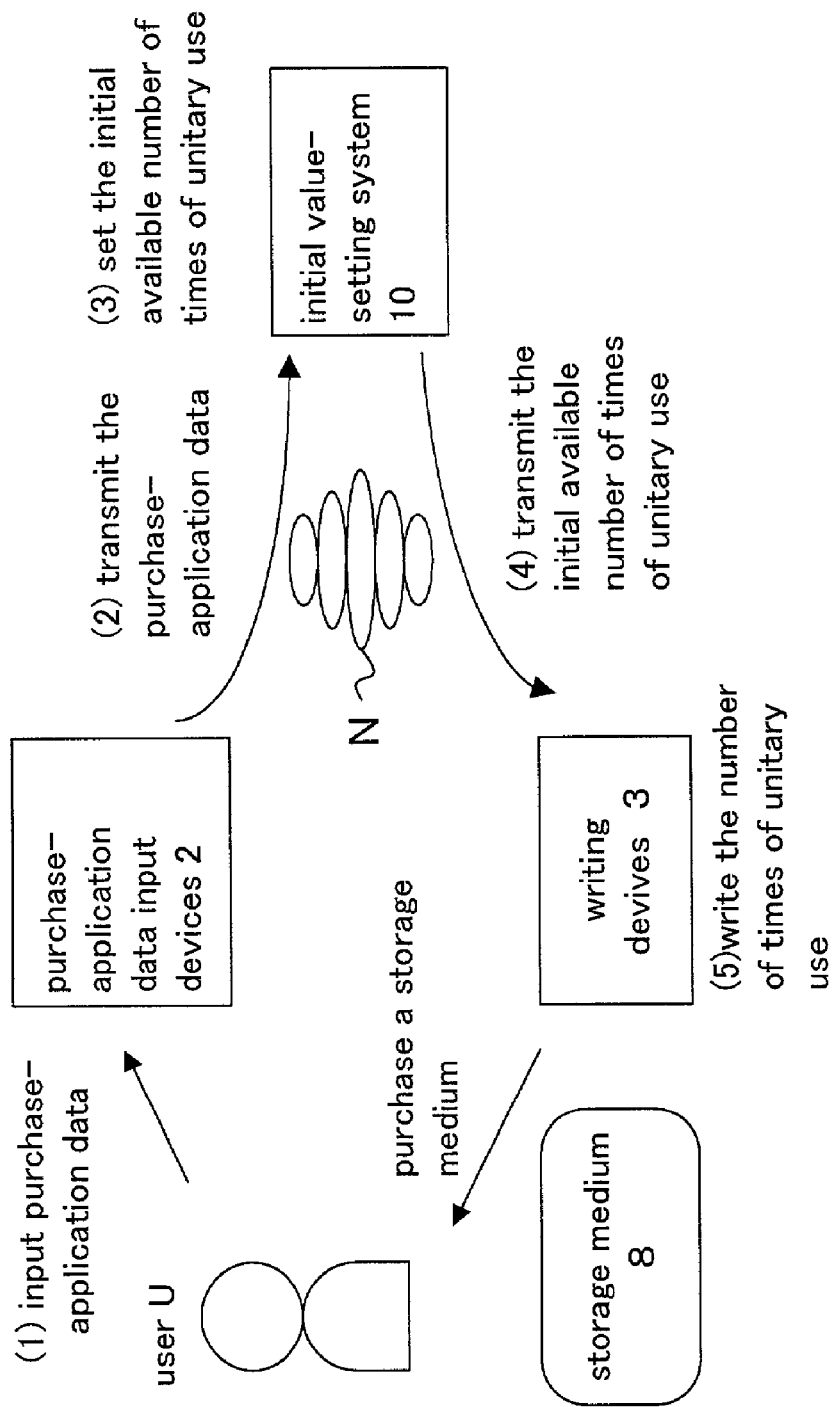
FIG. 4 shows another data flow in the operating system of FIG. 1.

As shown in FIG. 4, users U may input their purchase-application data in purchase-application-data input devices 2. In this case, personnel expenses for salesclerk can be saved.

The initial value-setting system 10 in the initial value-setting device 1 will next be described in detail.

Figure 5:
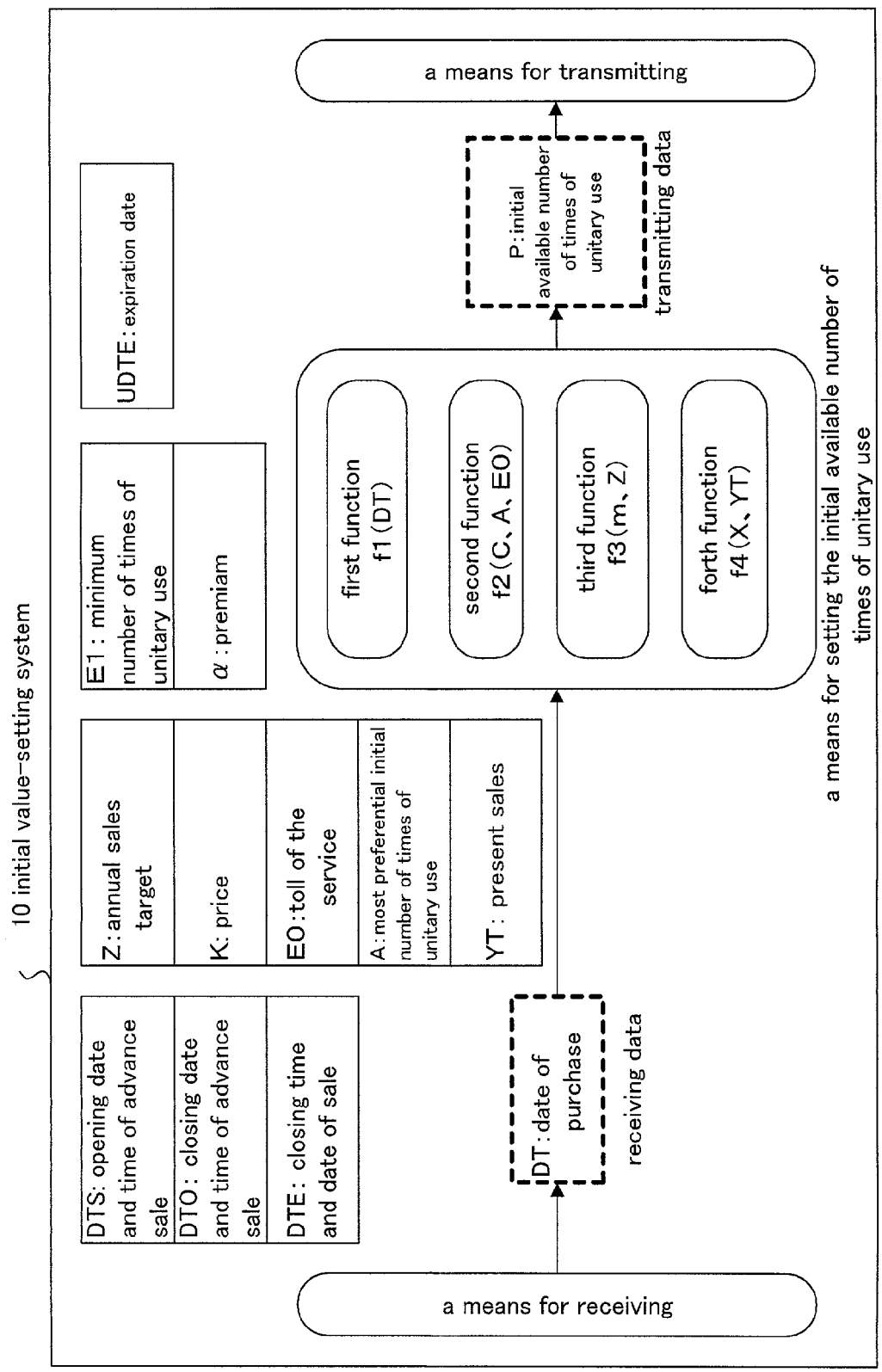
FIG. 5 shows a configuration of the initial value-setting system of the operating system of FIG. 1.

In FIG. 5, solid-line rectangular frames indicate storage areas; broken-line rectangular frames, data received and to be transmitted; and solid-elliptic frames, processing programs. As shown in FIG. 5, the initial value-setting system 10 has a means for receiving the date of sale of each prepaid available number-of-times-of-unitary-use storage medium 8, a means for setting the initial available number of times of unitary use P of said storage medium 8, a means for transmitting said initial number P, and the storage areas.

Data stored in the storage areas of the initial value-setting system 10 are as follows:

(1) Opening date and time of advance sale: DTS
  DTS is the opening date and time of advance sale of prepaid available number-of-times-of-unitary-use storage media 8 for a certain service.
(2) Closing date and time of advance sale: DTO
  DTO is the closing date and time of advance sale of the storage media 8.
(3) Closing time and date of sale: DTE
  DTE is the closing date and time of ordinary sale, as distinct from the advance sale, of the storage media 8.
(4) Price: K
  K is the price of a storage medium 8.
(5) Annual sales target: Z
  Z is an annual sales target of the storage media 8.
(6) Toll: $E_0$
  $E_0$ is the toll of the service. If the service is the traffic on a bridge, one time of traffic may costs 10 times of unitary use out of the available number of times of unitary use in a storage medium 8.
(7) Most preferential initial number of times of unitary use: A
  "A" is a most preferential initial number of times of unitary use to be given to purchasers during the advance sale.
(8) Present sales: YT
  YT is the sales of storage media 8 from DTS to the purchase date and time DT of each storage medium 8.
(9) Minimum number of times of unitary use: E1
  E1 is a minimum number of times of unitary use to be given to any storage media 8 of which the calculated initial available numbers are smaller than the minimum number.
(10) Premium "α" for repeaters, etc.
  This premium "α" is given to purchasers who purchase a storage medium 8 twice or more and other purchases who deserve the premium otherwise.
(11) Expiration date: UDTE
  UDTE is the expiration date of validity of the storage media 8. UDTE may be determined by adding a certain period of time to the date and time of purchase DT of each storage medium 8. For storage media 8 sold in the advance-sale period, their UDTE may be determined by adding a certain period of time to DTO.

The means for setting the initial available number of times of unitary use P of each storage medium 8 is provided with the following function programs $f_1$ to $f_4$.

The first function $f_1(DT)$ is to calculate the number of days from DTO to the purchase date and time DT of each storage medium 8.

Figure 6:
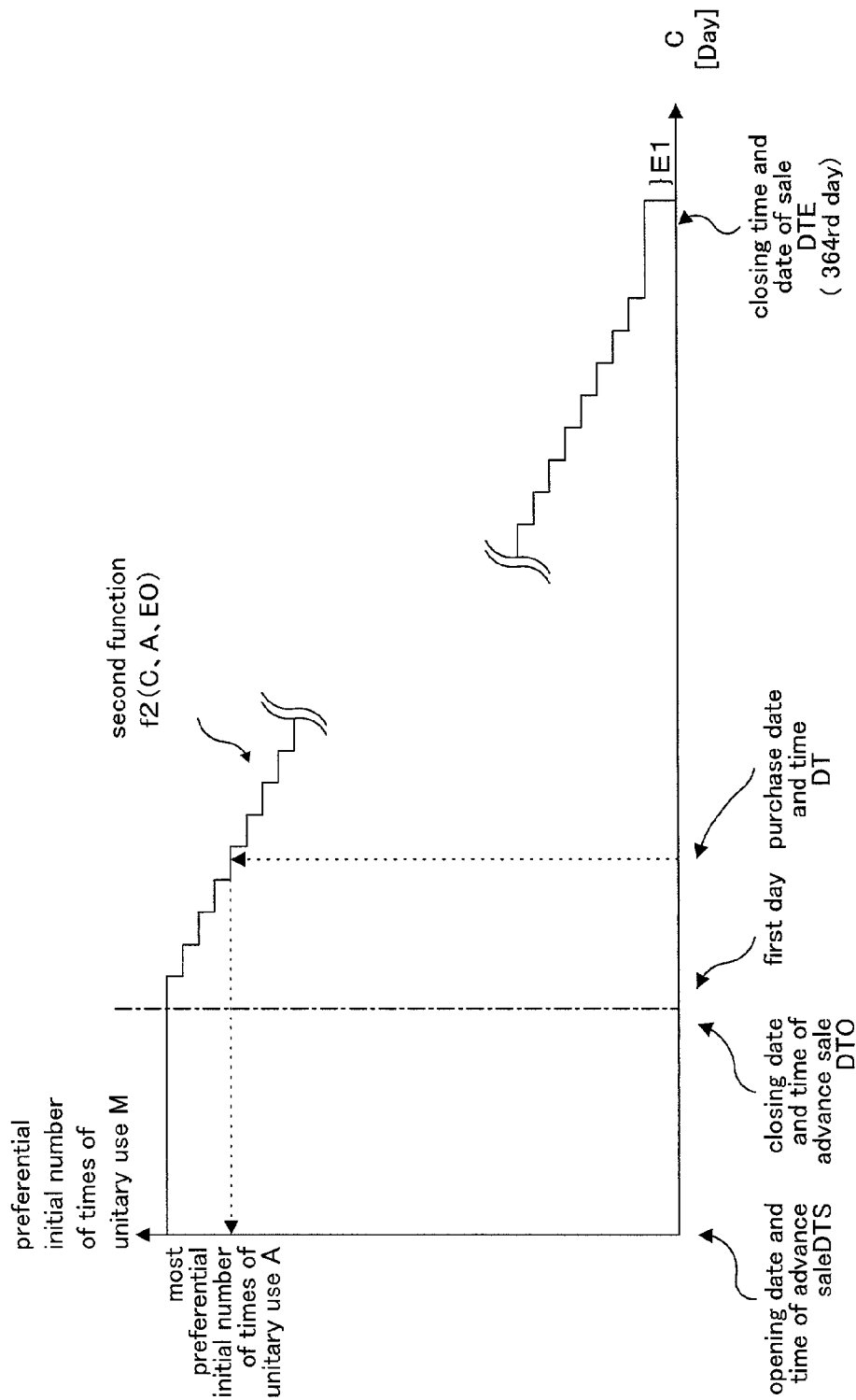
FIG. 6 is a graph of a function $f_2(C, A, E_0)$ to calculate a preferential initial number of times of unitary use at the purchase date and time of the storage medium of FIG. 1.

The second function $f_2(C, A, E_0)$ is to calculate the preferential initial number of times of unitary use "m" at DT of each storage medium 8. FIG. 6 shows the relation between DT and "m." The horizontal axis represents DT, the vertical axis, m. This program has the following features.

(1) Storage media 8 with DT between DTS and DTO are given a larger initial available number of times of unitary use P than those with DT between DTO and DTE.
(2) In the time period between DTO and DTE, the earlier the DT is, the larger the preferential initial number of times of unitary use m is. The preferential initial number of times of unitary use m may be calculated as follow.

$$m = A - E_0 \cdot C$$

(3) In the time period between DTS and DTO, the preferential initial number of times of unitary use is constant at A (most preferential initial number of times of unitary use), which is an arbitrary constant.

In this embodiment, the initial available number of times of unitary use P is changed by day between DTO and DTE. It may, however, be changed by second or any other unit.

The third function $f_3(m, Z)$ is to calculate the ratio X of m to Z.

$$X = m/Z$$

The fourth function $f_4(X, YT)$ is to calculate the initial available number of times of unitary use P based on X and YT.

$$P = X \cdot YT$$

Figure 7:
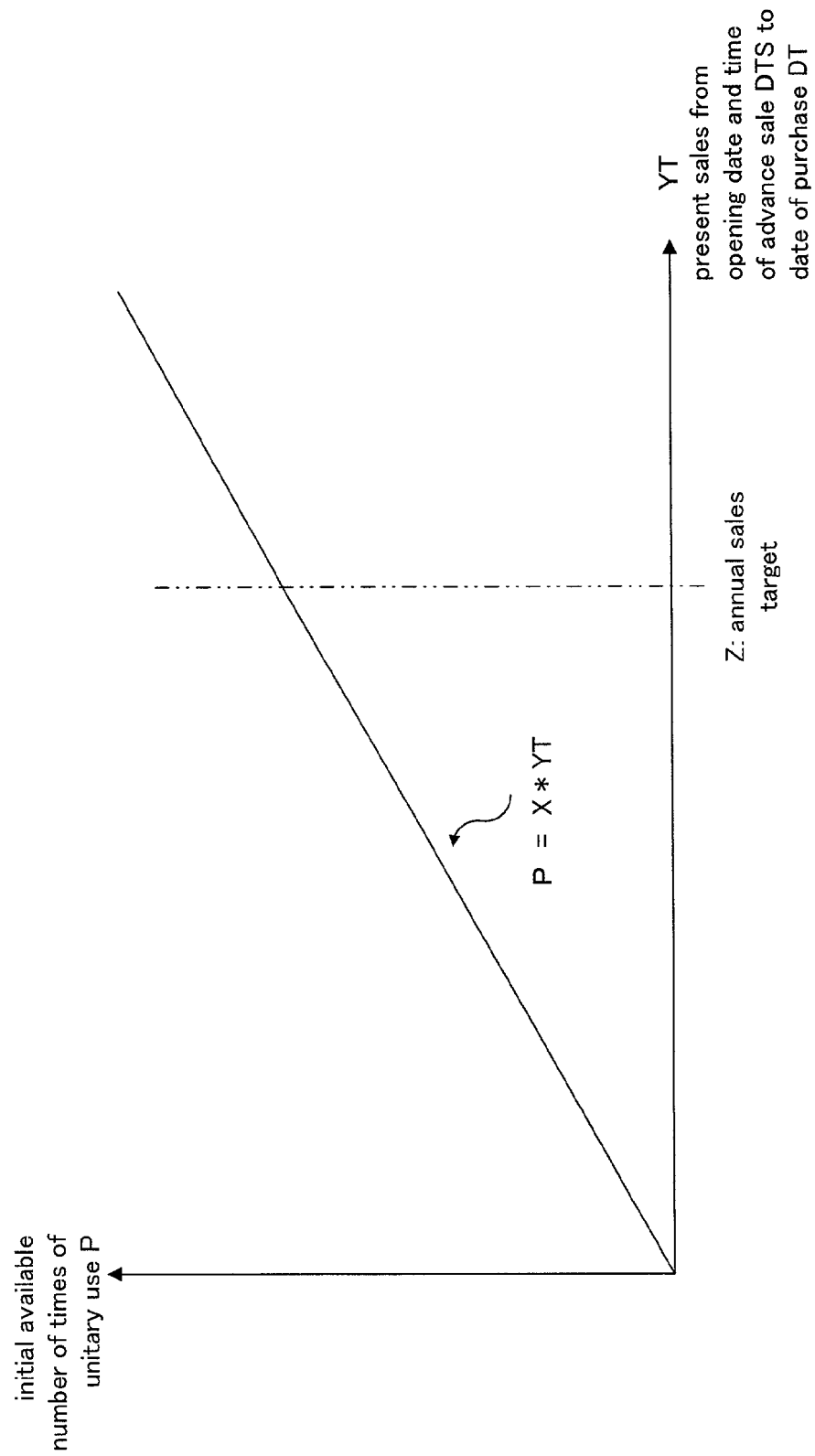
FIG. 7 is a graph of a function $f_4(X, YT)$ to calculate the initial number of times of unitary use of the storage medium of FIG. 1.

FIG. 7 shows the relation between YT and P. The abscissa represents YT, the ordinate, P. The function is represented by the straight line starting from the origin with an angle of inclination X.

Figure 8:
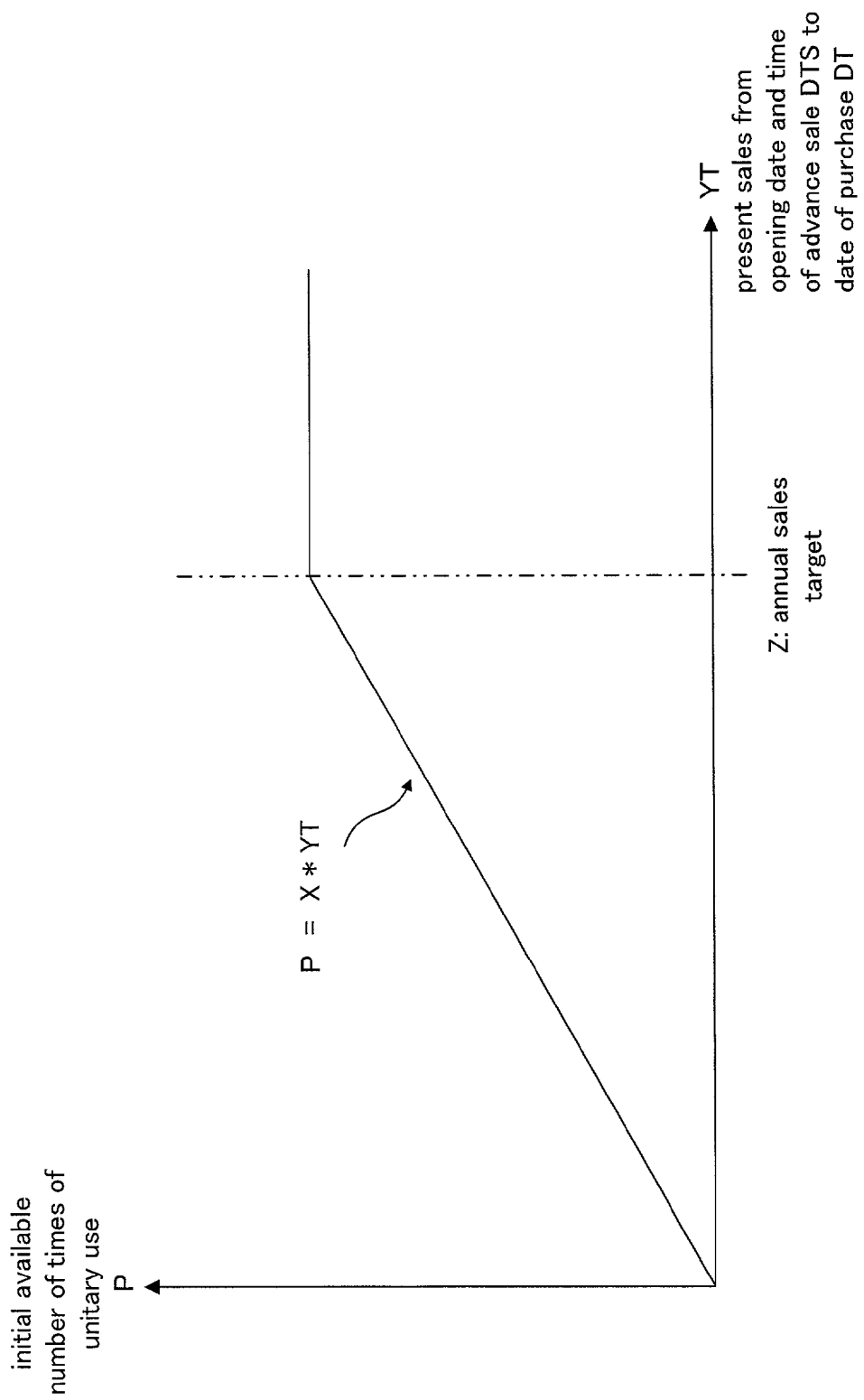
FIG. 8 is another graph of the function $f_4(X, YT)$.

As shown in FIG. 8, P may be made flat at a point in time between DTO and DTE. In FIG. 8, it is made flat when YT reaches Z.

Accordingly, with the means for setting the initial available number of times of unitary use P of each storage medium 8, P can be set as follows.
(1) The initial numbers P of storage media 8 with DT between DTS and DTO are higher than those of storage media 8 with DT between DTO and DTE.
(2) In the time period between DTO and DTE, the earlier the DT is, the larger the initial number P is.
(3) In the time period between DTS and DTO, the initial number P is constant.

The process of setting the initial available number of times of unitary use P of each storage medium 8 will be described next.

Figure 9:
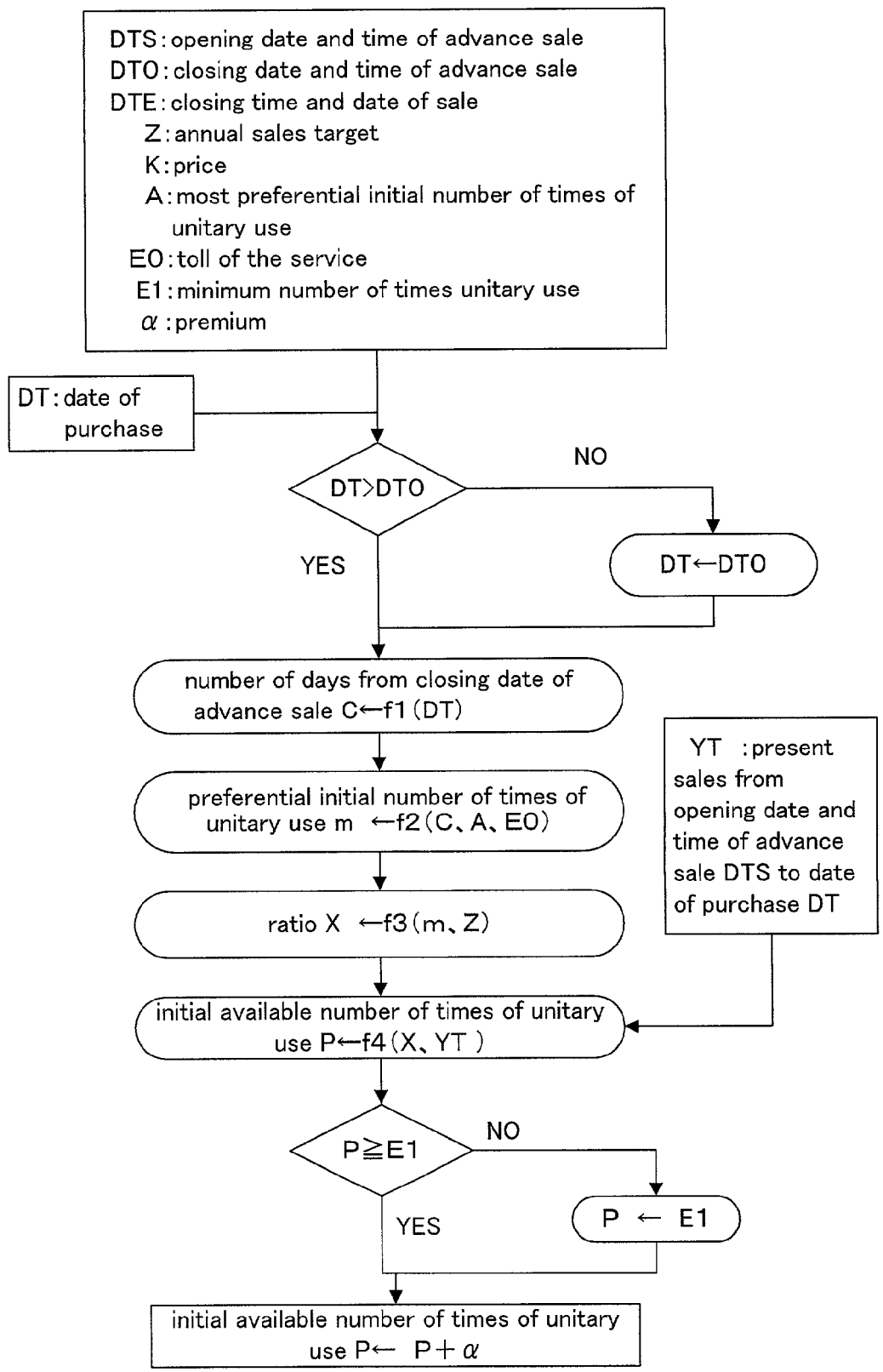
FIG. 9 is a flowchart of a process of setting the initial number of times of unitary use of the storage medium of FIG. 1.

As shown in FIG. 9, when an user appears for a storage medium 8, a timer in the purchase-application-data input device 2 records the present date and time DT. If the recorded DT is before DTO, DTO is substituted for the recorded DT.

Then the function $f_1(DT)$ calculates the number of days C from the DTO to the recorded DT, and the function $f_2(C, A, E_0)$ calculates the preferential initial number of times of unitary use "m."

Next the function $f_3(m, Z)$ calculates the ratio X, and the function $f_4(X, YT)$ calculates the initial value P.

If the calculated P is smaller than $E_1$, $E_1$ is substituted for the calculated P. Thus the initial number P of every storage medium 8 is equal to or larger than $E_1$.

Lastly, added to the initial number "P" is the premium "α," if user deserves it.

The process of rewriting data in prepaid available number-of-times-of-unitary-use storage media 8 will be described.

Figure 10:
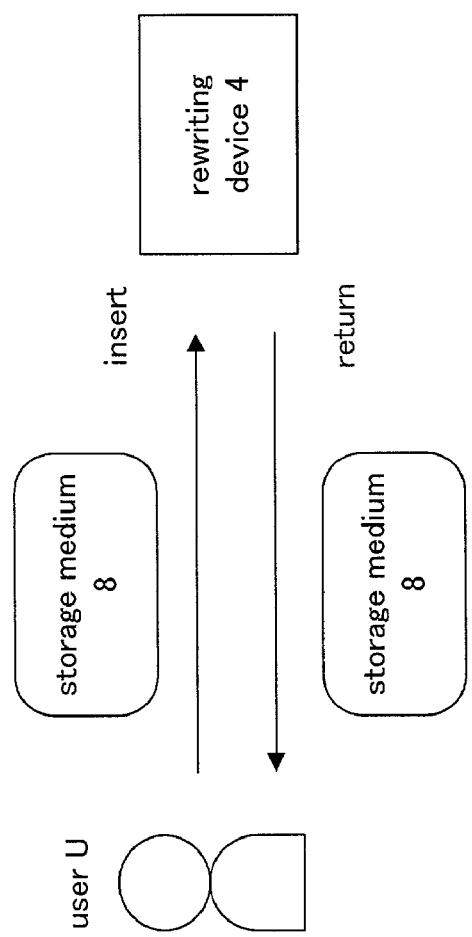
FIG. 10 is an illustration to show how to rewrite the number of times of unitary use stored in the storage medium of FIG. 1.
Figure 11:
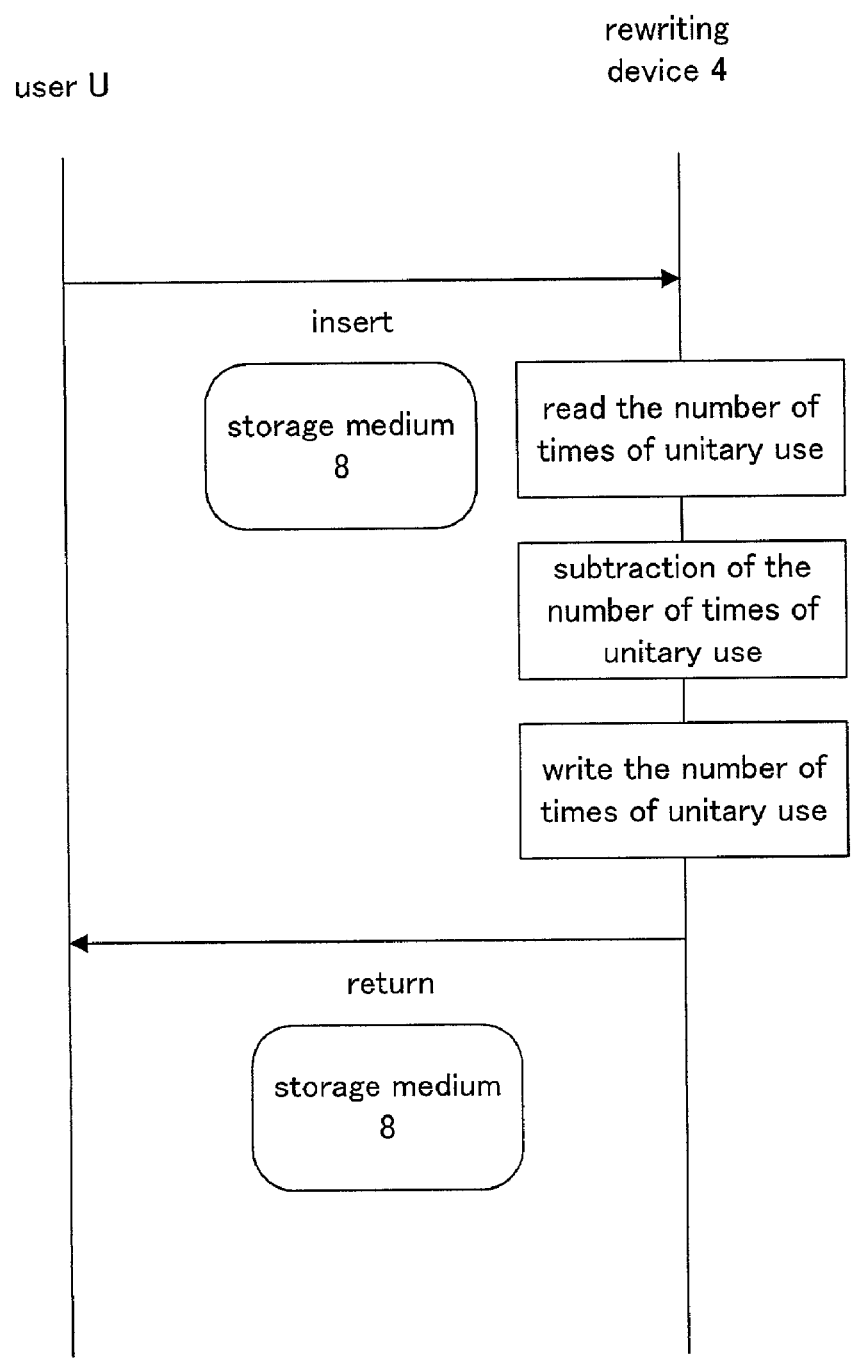
FIG. 11 shows the sequence of events in a process of rewriting the remaining number of times of unitary use of the storage medium in the operating system of FIG. 1.

As shown in FIGS. 10 and 11, when an user U inserts his storage media 8 in a rewriting device 4, the device reads the remaining available number of times of unitary use in the storage medium 8, subtracts the toll from the remaining number, and writes the remaining number after the subtraction into the medium 8. Then the rewriting device 4 returns the storage medium 8 to the user U.

Figure 12:
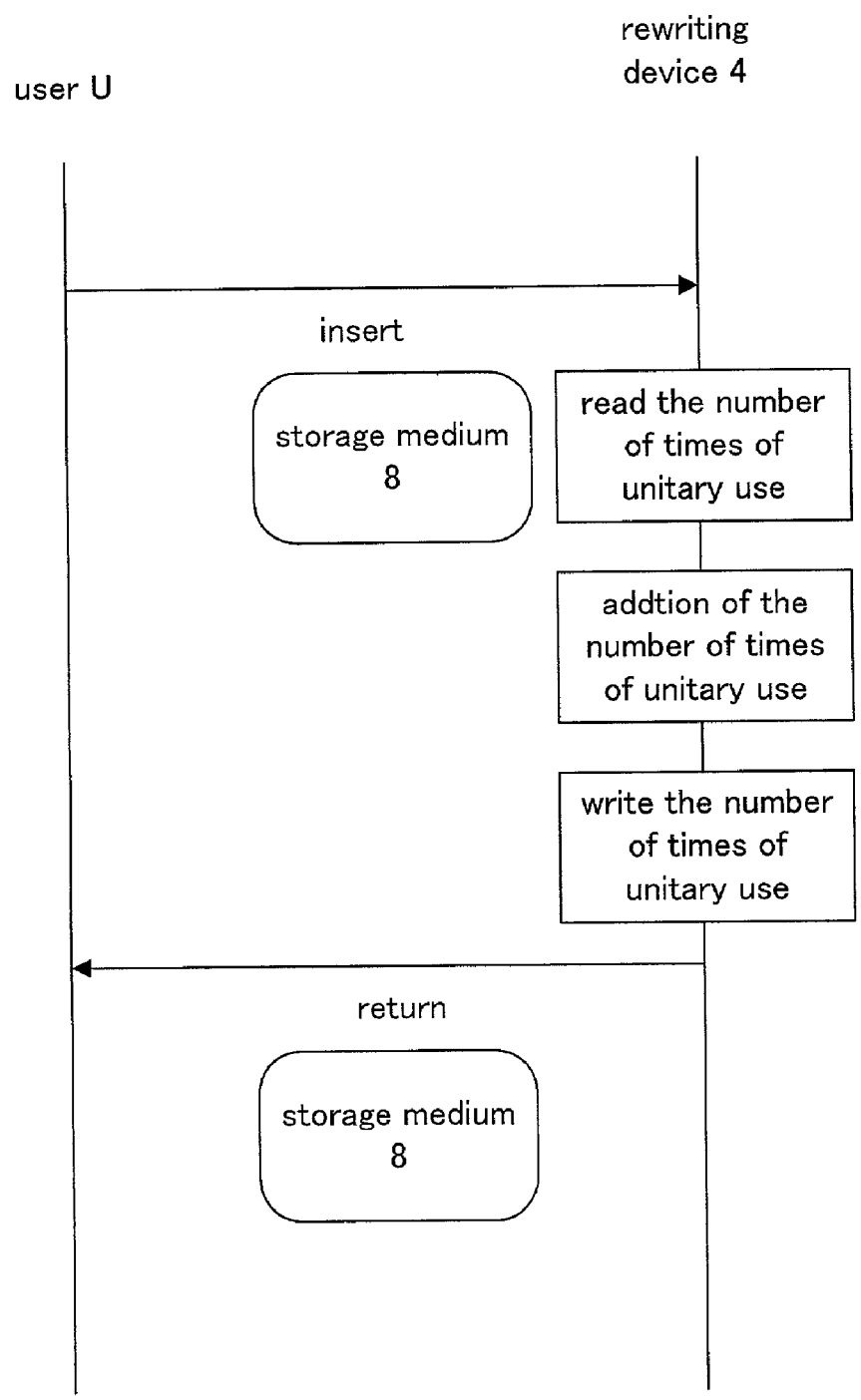
FIG. 12 shows the sequence of events in another process of rewriting the remaining number of times of unitary use of the storage medium in the operating system of FIG. 1.

In case that YT causes a situation that the later the DT is, the larger the initial number P is, the situation can be reversed by dispensing the benefit of YT in advance, as shown in FIG. 12.

Besides, it is preferable that the storage medium 8 is a non-contact IC card because its rewrite can be done just by holding it in front of a rewriting device 4.

The operating system 20A in accordance with the first embodiment of the present invention brings about the following effects.
(1) The initial number P of storage media 8 with DT between DTS and DTO can be set higher than those of storage media 8 with DT between DTO and DTE.
(2) In the time period between DTO and DTE, the earlier the DT of the storage medium 8 is and the larger the YT at the DT is, the larger the initial number P of the storage medium 8 is. Therefore users are induced to buy storage media 8 earlier, enabling the service provider to recover its investment earlier.
(3) In the time period between DTS and DTO, the initial number P of the storage medium 8 is kept constant. Therefore users have no reason to rush upon the opening of the advance sale, distributing the information-processing load in the operating system 20A over the time period of the advance sale.

Now, the second embodiment of operating system of the present invention will be described.

Figure 13:
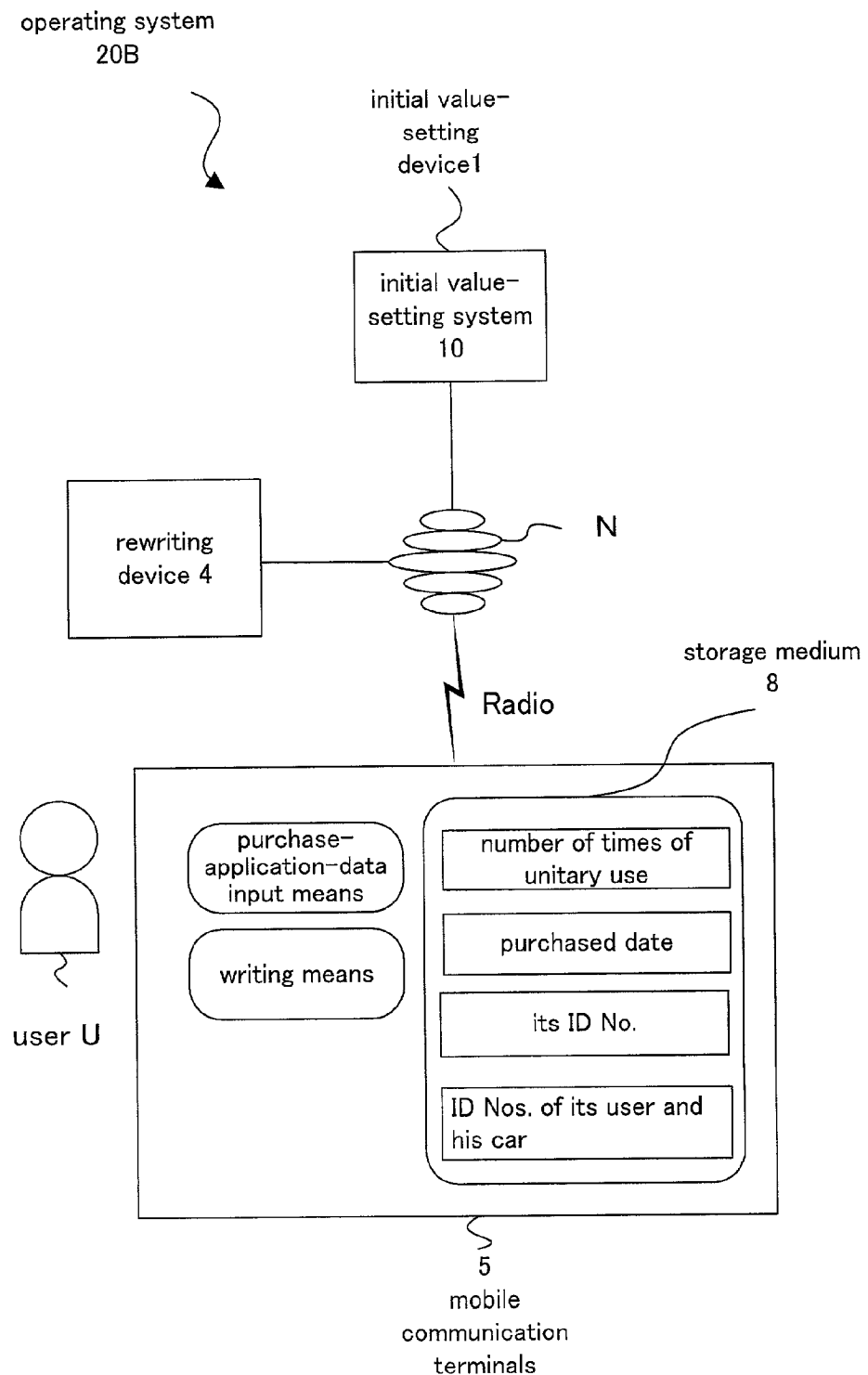
FIG. 13 shows a schematic block diagram of a second embodiment of operating system in accordance with the invention. The prepaid available number-of-times-of-unitary-use storage medium shown in this FIG. is the same as that shown in FIG. 1.

As shown in FIG. 13, the operating system 20B for a certain service comprises a device for setting the initial available numbers of times of unitary use of prepaid available number-of-times-of-unitary-use storage media 8 (hereinafter referred to as "initial value-setting device 1"), mobile communication terminals 5, and a device for rewriting the numbers of times of unitary use stored in the storage media 8 (hereinafter referred to as "rewriting device 4"). The initial value-setting device 1 and the rewriting device 4 are substantially the same as those of the operating system 20A of the first embodiment.

The mobile communication terminals 5 will be described below.

Each mobile communication terminal 5 is a portable telephone, a cellular phone, or the like and has a prepaid available number-of-times-of-unitary-use storage medium 8, a purchase-application-data input means, and a writing means.

The purchase-application-data input means of each mobile communication terminal 5 is to input purchase-application data on an user and transmits the data through a communication network N to the initial value-setting device 1.

The writing means of said mobile communication terminal 5 is to write, into the storage medium 8 in said mobile communication terminal 5, the initial available number of times of unitary use P which is sent from the initial value-setting device 1 through the communication network N.

Figure 14:
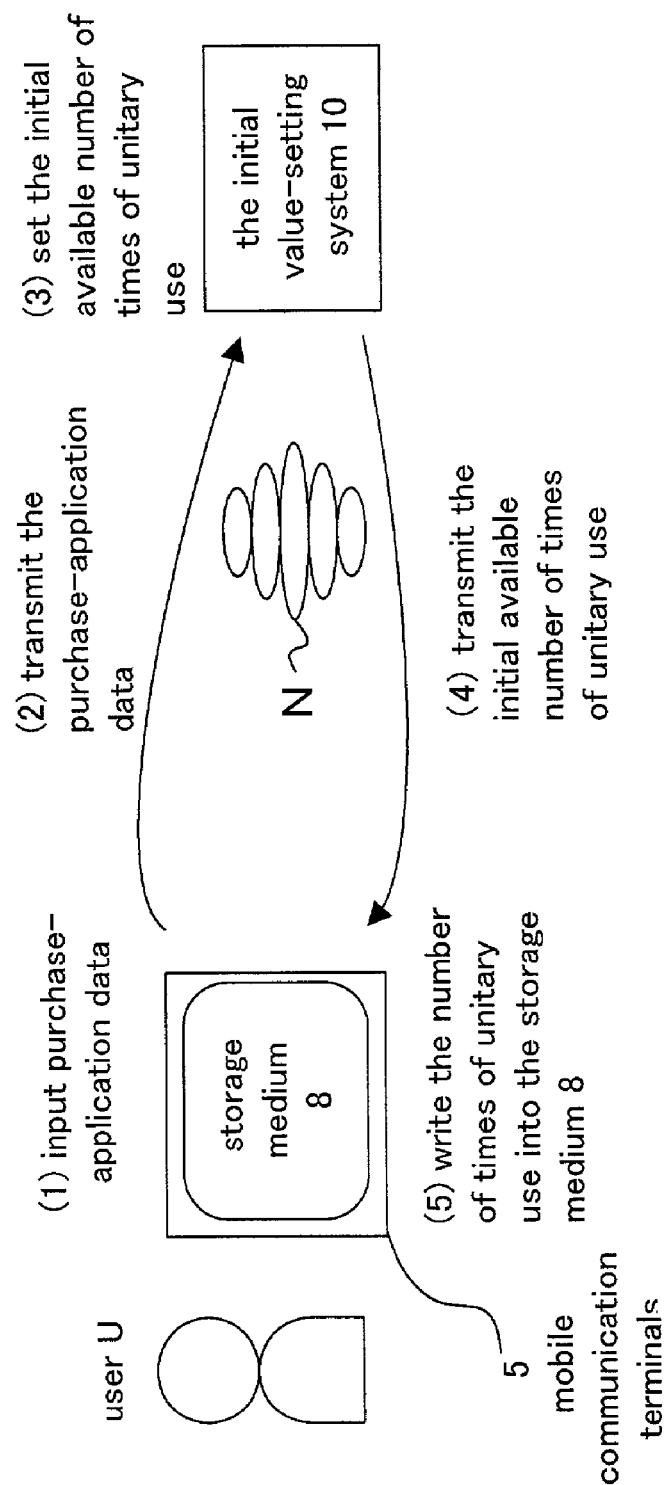
FIG. 14 shows a data flow in the operating system of FIG. 13.
Figure 15:
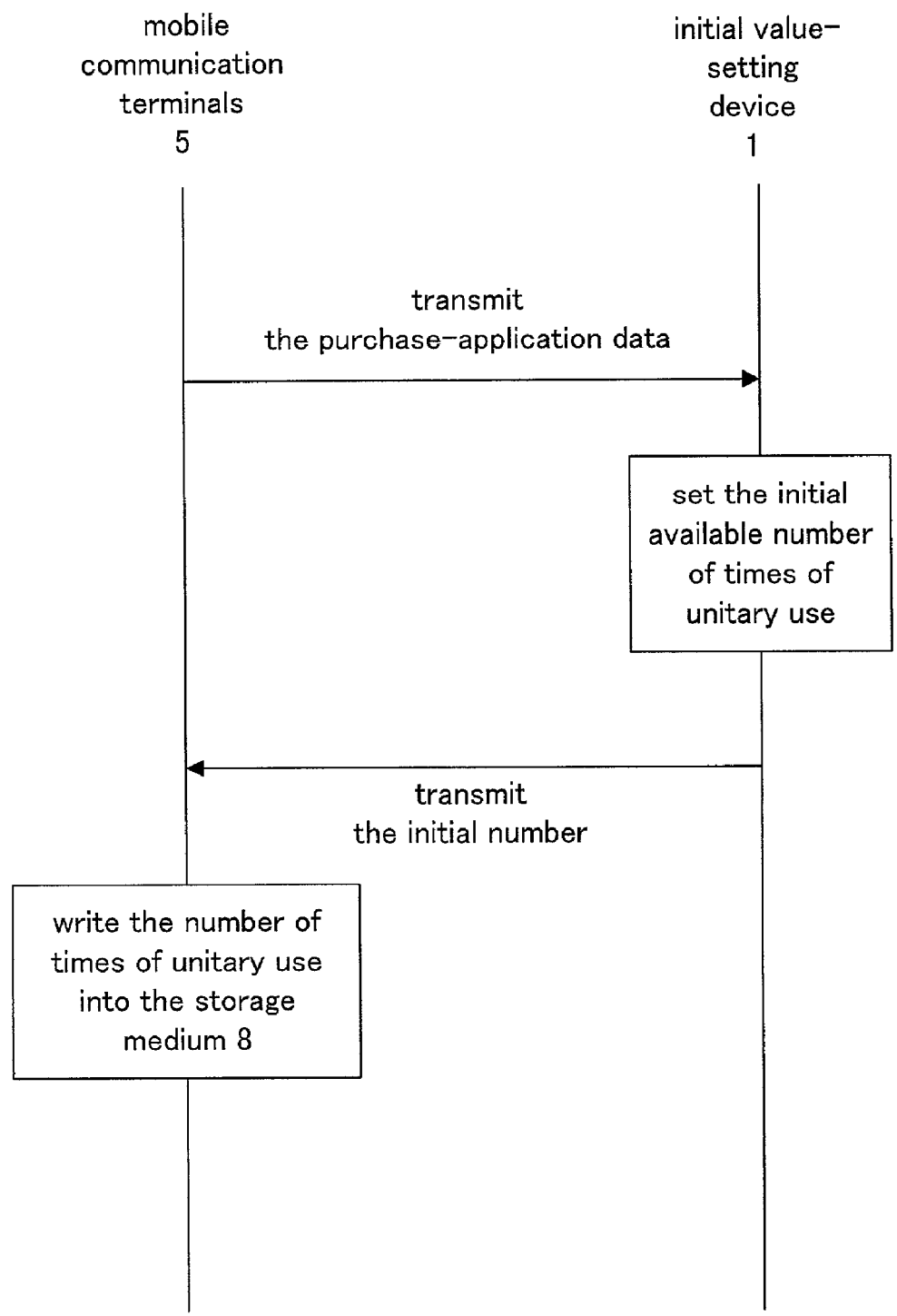
FIG. 15 shows a sequence of events in the operating system of FIG. 13.

As shown in FIGS. 14 and 15, an user U inputs his purchase-application data into his mobile communication terminal 5 by using its purchase-application-data input means and transmits the data to the initial value-setting device 1.

The initial value-setting system 10 of the initial value-setting device 1 calculates the initial available number of times of unitary use P for the user and transmits the initial number P to his mobile communication terminal 5. The writing means of the mobile communication terminal 5 writes the initial number P into the storage medium 8 in the mobile communication terminals 5.

The process of rewriting data in storage media 8 will next be described.

Figure 16:
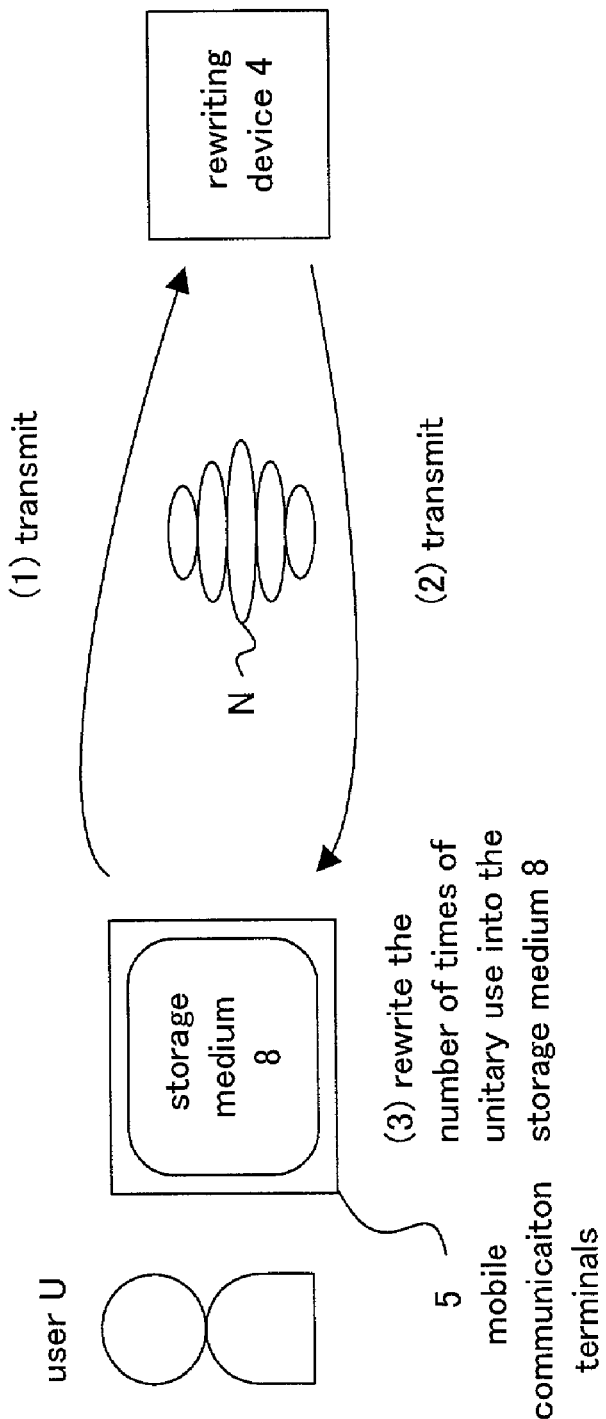
FIG. 16 is an illustration to show how to rewrite the number of times of unitary use stored in the storage medium of FIG. 13.
Figure 17:
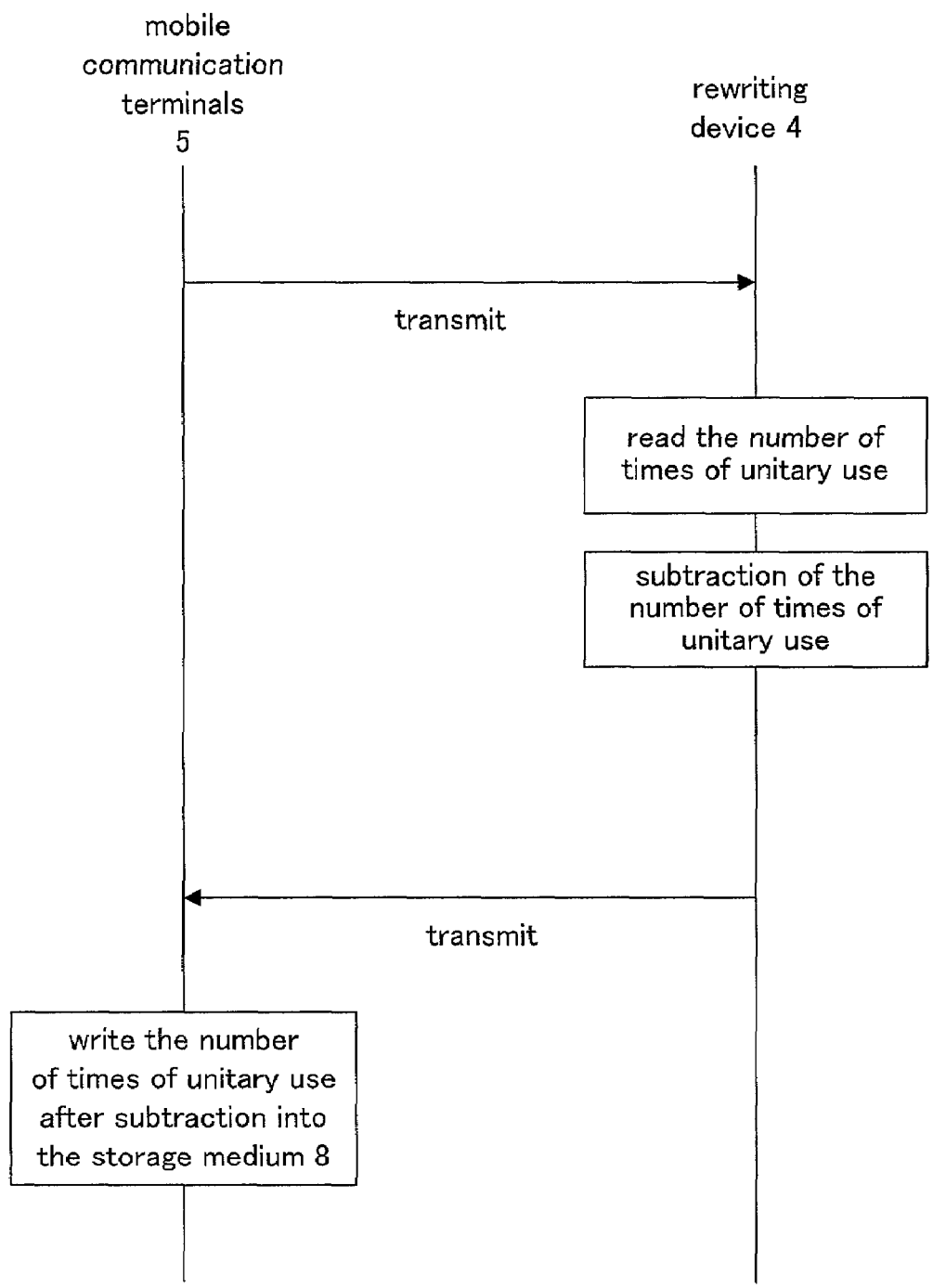
FIG. 17 shows the sequence of events in a process of rewriting the remaining number of times of unitary use of the storage medium in the operating system of FIG. 13.

As shown in FIGS. 16 and 17, when an user U transmits his remaining available number of times of unitary use from his mobile communication terminal 5 to the rewriting device 4, the device subtracts the toll from the remaining number, and writes the remaining number after the subtraction into the storage medium 8 of the mobile communication terminal 5.

Figure 18:
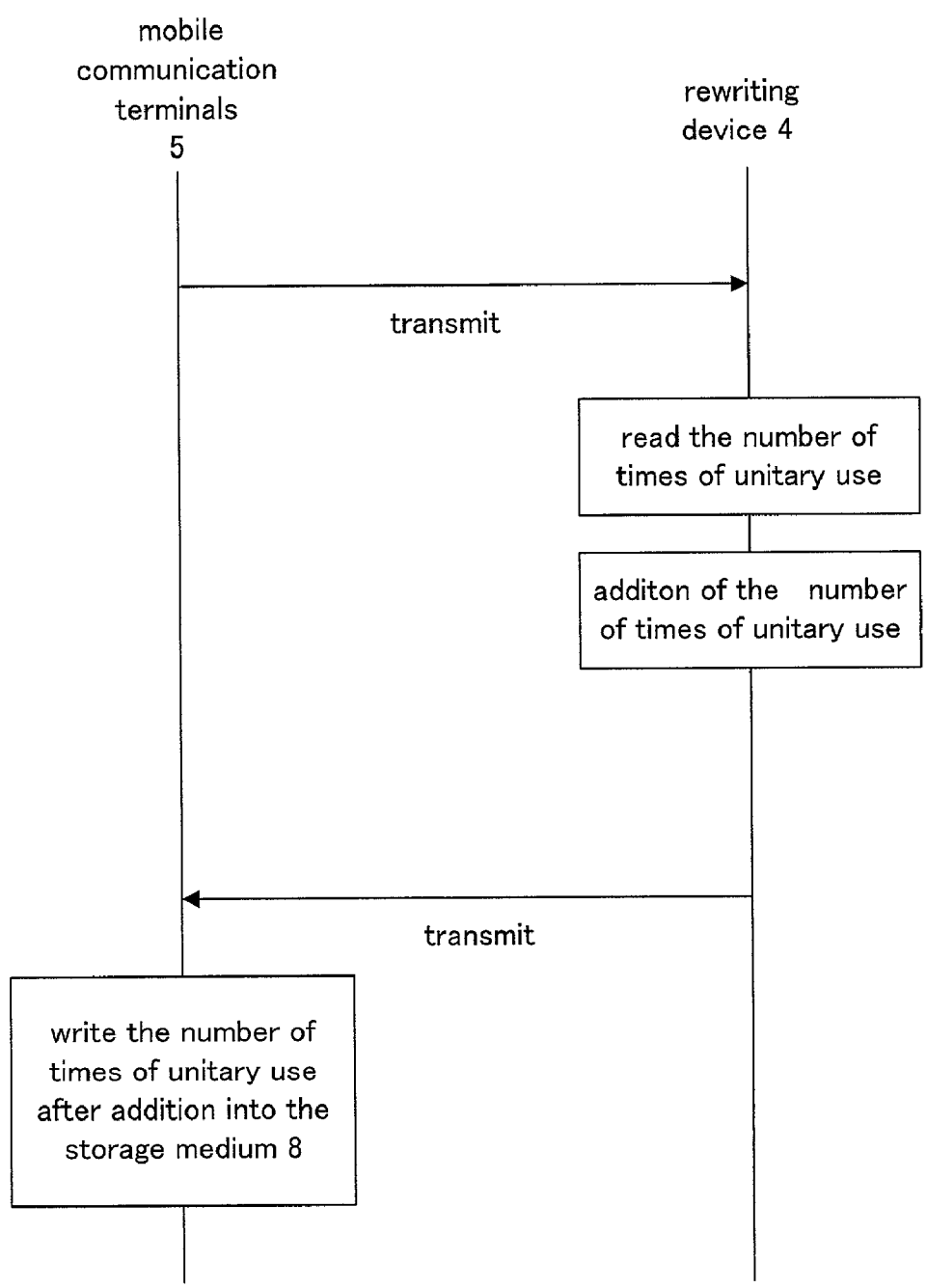
FIG. 18 shows the sequence of events in another process of rewriting the remaining number of times of unitary use of the storage medium in the operating system of FIG. 13.

In case that YT causes a situation that the later the DT is, the larger the initial number P is, the situation can be reversed by dispensing the benefit of YT in advance, as shown in FIG. 18.

As in the case of the operating system 20A of the first embodiment, the operating system 20B in accordance with the second embodiment of the present invention brings about the following effects.
(1) The initial number P of storage media 8 with DT between DTS and DTO can be set higher than those of storage media 8 with DT between DTO and DTE.
(2) In the time period between DTO and DTE, the earlier the DT of the storage medium 8 is and the larger the YT at the DT is, the larger the initial number P of the storage medium 8 is. Therefore users are induced to buy storage media 8 earlier, enabling the service provider to recover its investment earlier.
(3) In the time period between DTS and DTO, the initial number P of the storage medium 8 is kept constant. Therefore users have no reason to rush upon the opening of the advance sale, distributing the information-processing load in the operating system 20B over the time period of the advance sale.

Furthermore, because the operating system 20B uses mobile communication terminals 5, users can use the system from any places conveniently.

Now, the third embodiment of operating system of the present invention will be described.

Figure 19:
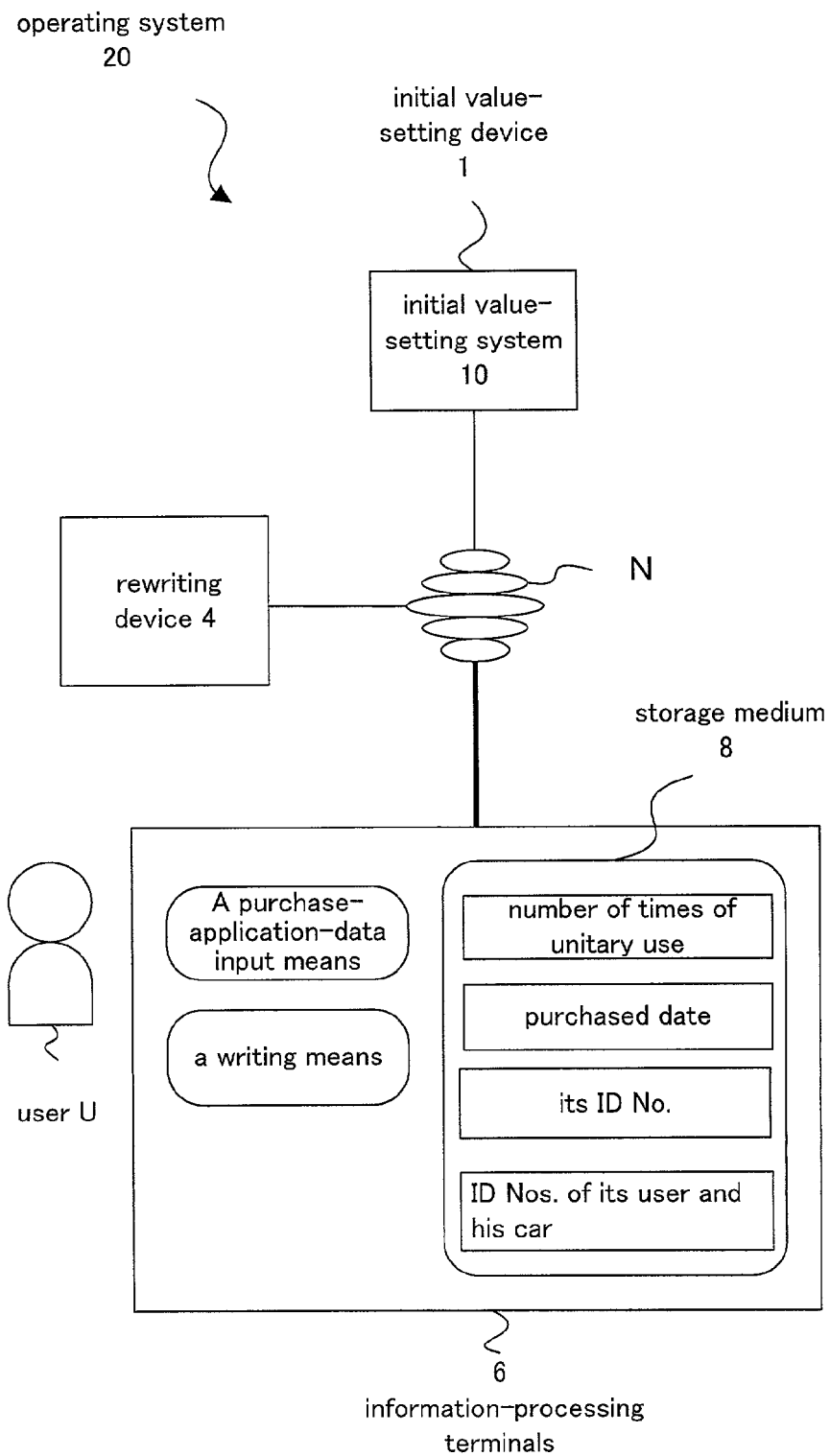
FIG. 19 shows a schematic block diagram of a third embodiment of operating system in accordance with the invention. The prepaid available number-of-times-of-unitary-use storage medium shown in this FIG. is the same as that shown in FIG. 1.

As shown in FIG. 19, the operating system 20C for a certain service comprises a device for setting the initial available numbers of times of unitary use of prepaid available number-of-times-of-unitary-use storage media 8 (hereinafter referred to as "initial value-setting device 1"), information-processing terminals 6, and a device for rewriting the numbers of times of unitary use stored in the storage media 8 (hereinafter referred to as "rewriting device 4"). The initial value-setting device 1 and the rewriting device 4 are substantially the same as those of the operating system 20B of the second embodiment.

The information-processing terminals 6 will be described below.

Each information-processing terminal 6 is a computer and has a prepaid available number-of-times-of-unitary-use storage medium 8, a purchase-application-data input means, and a writing means.

The purchase-application-data input means of each data-processing terminal 6 is to input purchase-application data on an user and transmits the data through a communication network N to the initial value-setting device 1.

The writing means of said data-processing terminal 6 is to write, into the storage medium 8 in said data-processing terminal 6, the initial available number of times of unitary use P which is sent from the initial value-setting device 1 through the communication network N.

Figure 20:
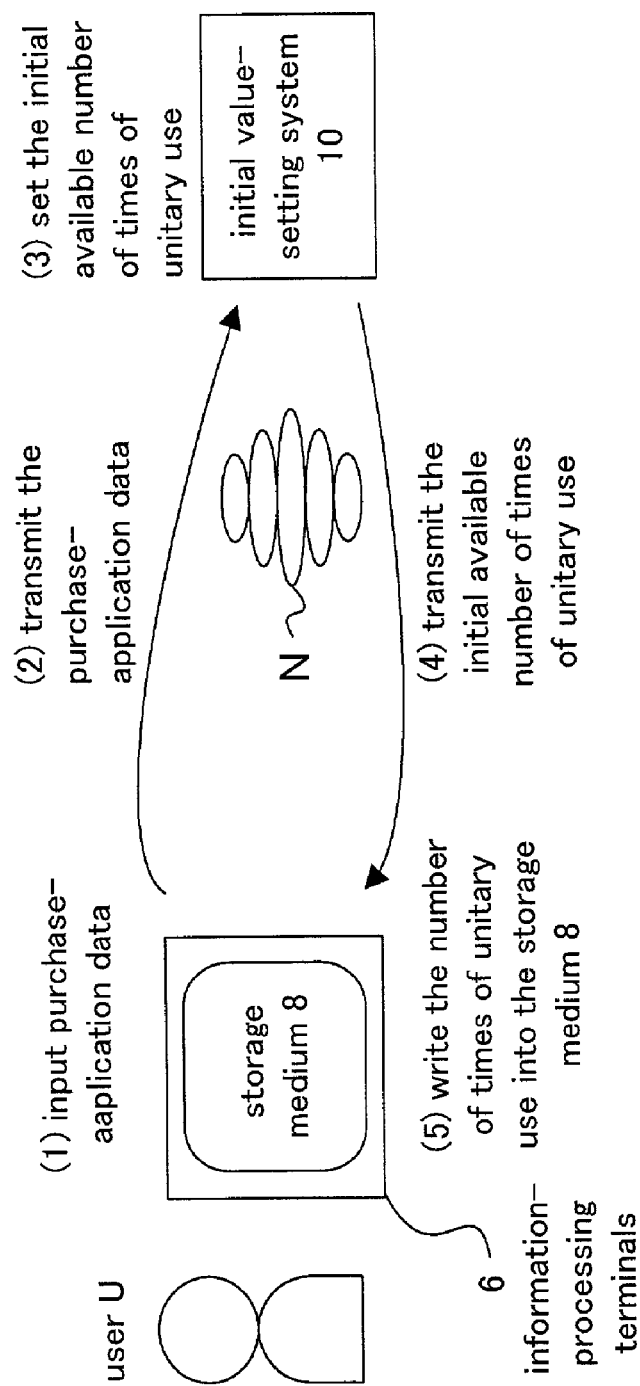
FIG. 20 shows a data flow in the operating system of FIG. 19.
Figure 21:
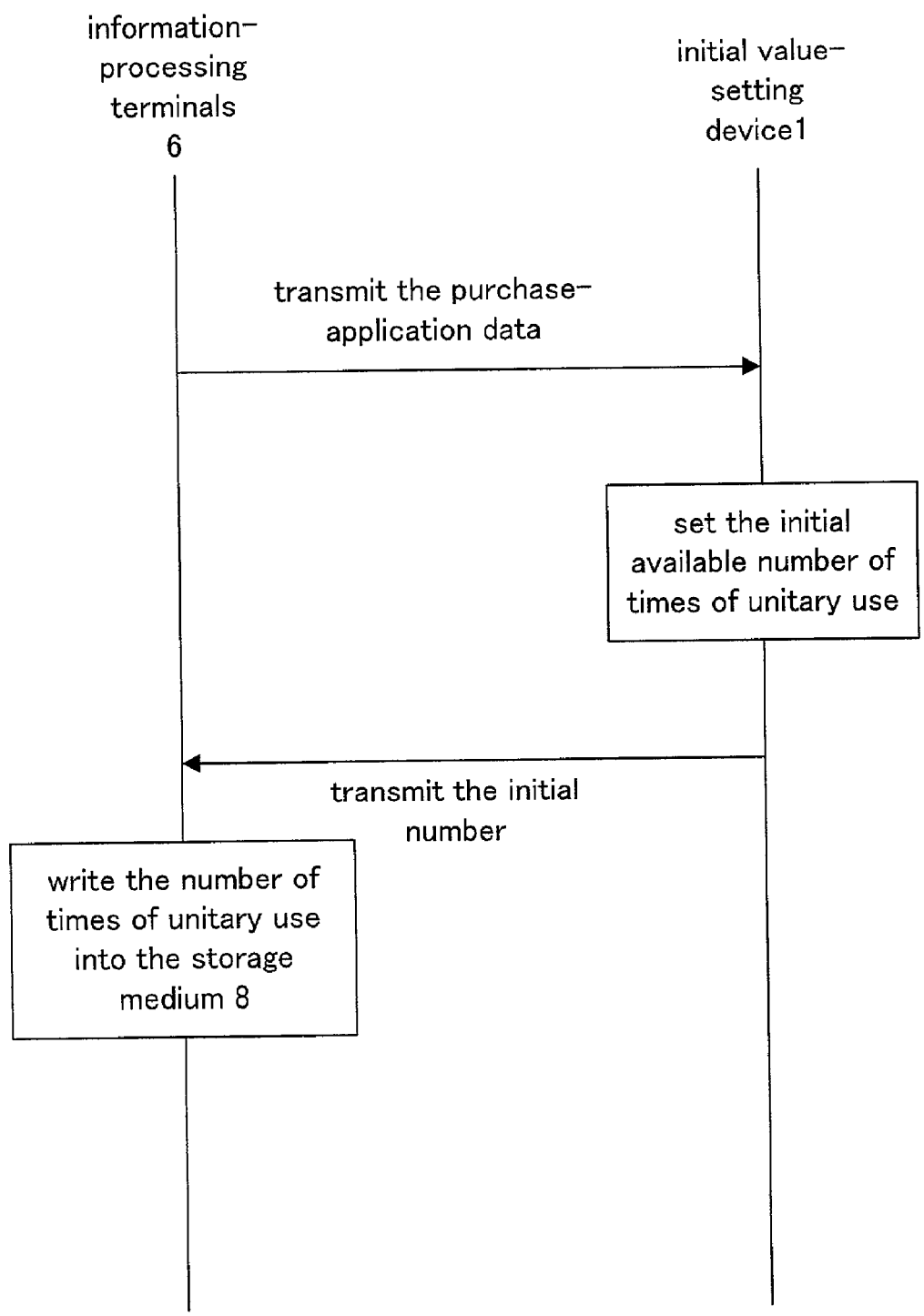
FIG. 21 shows a sequence of events in the operating system of FIG. 19.

As shown in FIGS. 20 and 21, an user U inputs his purchase-application data into his information-processing terminal 6 by using its purchase-application-data input means and transmits the data to the initial value-setting device 1.

The initial value-setting system 10 of the initial value-setting device 1 sets the initial available number of times of unitary use P for the user and transmits the initial number P to the information-processing terminal 6. The writing means of the information-processing terminal 6 writes the initial number P into the storage medium 8 in the data-processing terminal 6.

The process of rewriting data in storage media 8 will next be described.

Figure 22:
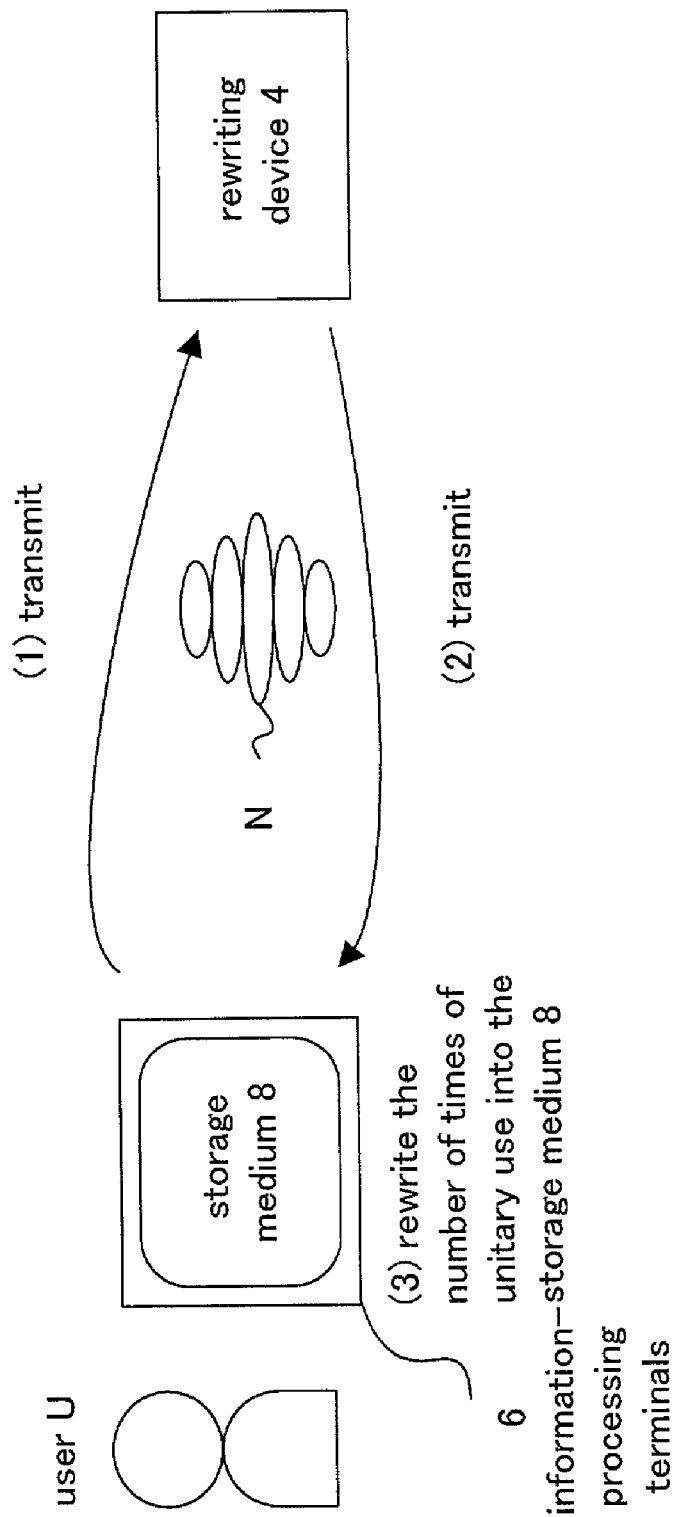
FIG. 22 is an illustration to show how to rewrite the number of times of unitary use stored in the storage medium of FIG. 19.
Figure 23:
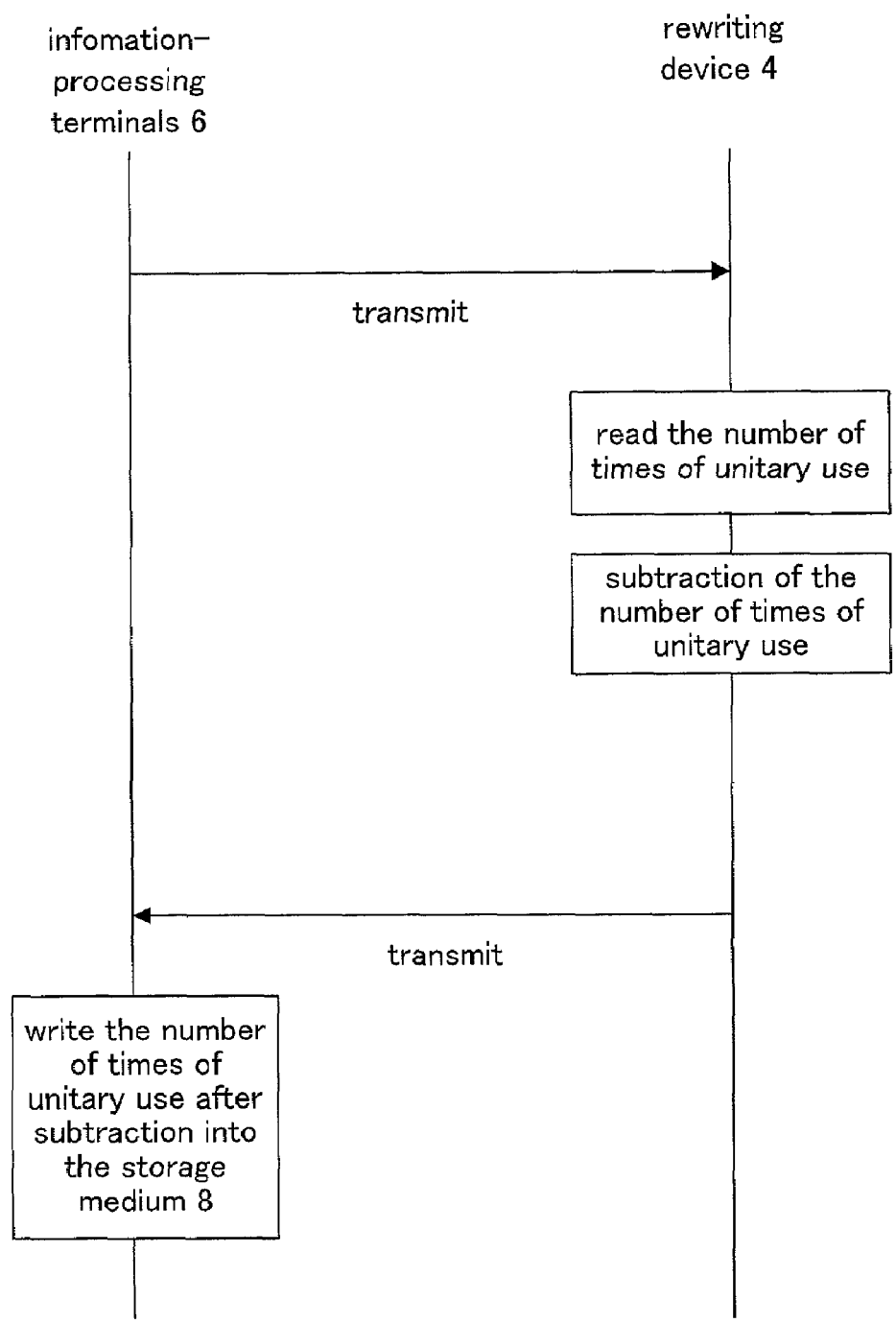
FIG. 23 shows the sequence of events in a process of rewriting the remaining number of times of unitary use of the storage medium in the operating system of FIG. 19.

As shown in FIGS. 22 and 23, when an user U transmits his remaining available number of times of unitary use from his information-processing terminal 6 to the rewriting device 4, the device subtracts the toll from the remaining number, and writes the remaining number after the subtraction into the storage medium 8 of the information-processing terminal 6.

Figure 24:
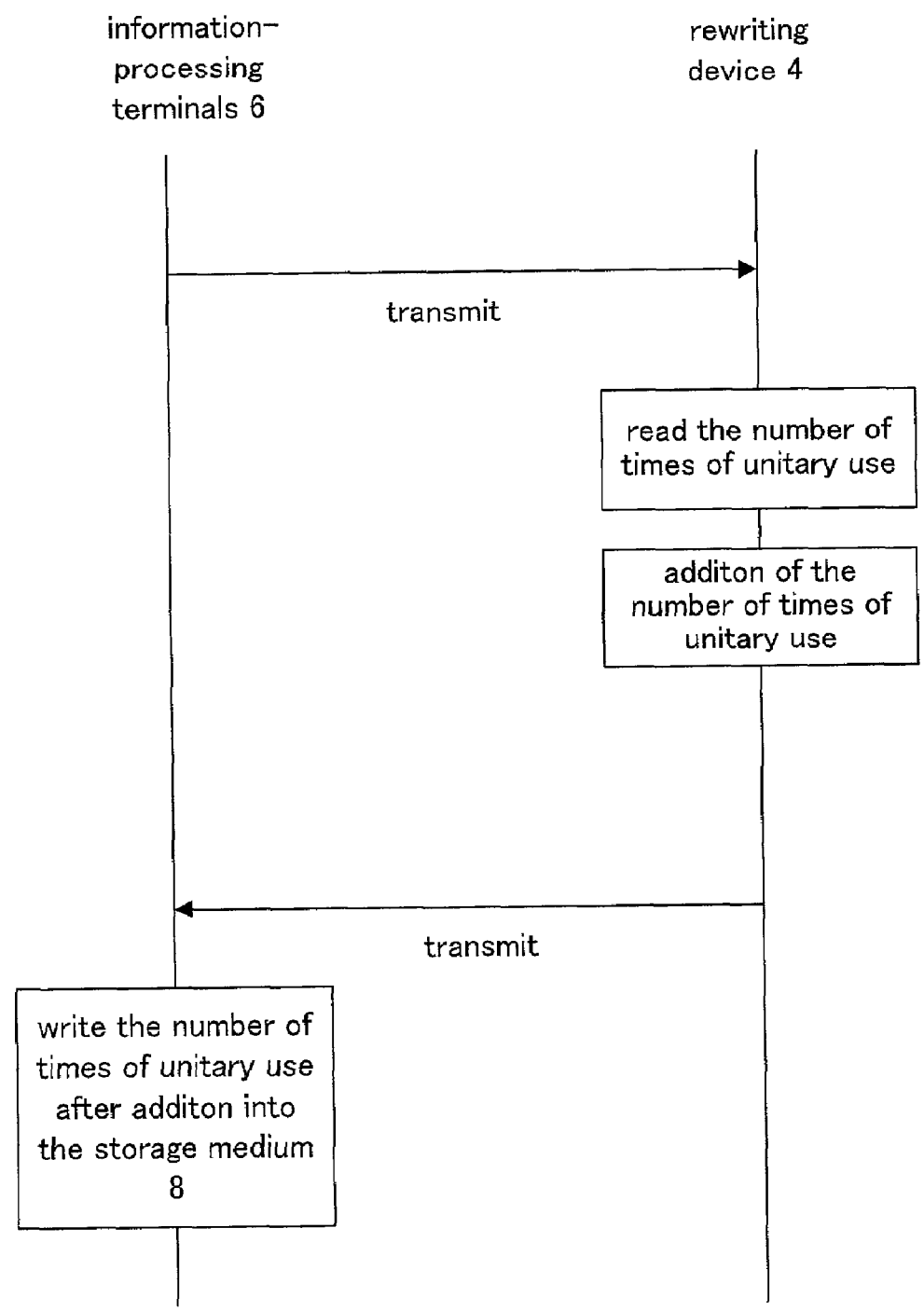
FIG. 24 shows the sequence of events in another process of rewriting the remaining number of times of unitary use of the storage medium in the operating system of FIG. 19.

In case that YT causes a situation that the later the DT is, the larger the initial value P is, the situation can be reversed by dispensing the benefit of YT in advance, as shown in FIG. 24.

As in the case of the operating system 20B of the second embodiment, the operating system 20C in accordance with the third embodiment of the present invention brings about the following effects.
(1) The initial number P of storage media 8 with DT between DTS and DTO can be set higher than those of storage media 8 with DT between DTO and DTE.
(2) In the time period between DTO and DTE, the earlier the DT of the storage medium 8 is and the larger the YT at the DT is, the larger the initial number P of the storage medium 8 is. Therefore users are induced to buy storage media 8 earlier, enabling the service provider to recover its investment earlier.
(3) In the time period between DTS and DTO, the initial number P of the storage medium 8 is kept constant. Therefore users have no reason to rush upon the opening of the advance sale, distributing the information-processing load in the operating system 20C over the time period of the advance sale.

Furthermore, because the operating system 20C uses information-processing terminals 6, users can use the system conveniently through information-processing terminals 6. It will be more convenient if users can take out the storage media 8 from their information-processing terminals 6 and carry the storage media 8 with them.

Now an example of the application of prepaid available number-of-times-of-unitary-use storage media 8 and the operating system 20A, 20B, or 20C of the present invention to an actual service will be described.

| | |
|---|---|
| Service Offered: | Traffic on the Seto-ohashi |
| Price K: | ¥1,000 |
| Opening date and time of advance sale DTS: | 00:00 a.m. on Mar. 1, 2001 |
| Closing date and time of advance sale DTO: | 00:00 a.m. on Apr. 1, 2001 |
| Closing data and time of sale DTE: | 00:00 a.m. on Apr. 1, 2002 |
| Annual sales target Z: | ¥20 billion |
| Most preferential initial number of times of unitary use A: | 7,300 units |
| Toll $E_0$: | 20 units |
| Minimum number of times of unitary use E1: | 60 units |
| Premium "α" for repeaters, etc.: | 120 units |

If an user purchases a storage medium 8 on Mar. 5, 2001, the day is his DT. Because his DT is before DTO, his DT is regarded to be DTO as shown in FIG. 9 and hence the number of days C from DTO to his DT is zero.

If an user purchases a storage medium 8 on May 1, 2001, the day is his DT; therefore his C is 30.

If the sales from DTS to an user's DT are ¥12 billion, the initial available number of times of unitary use P of his storage medium 8 is calculated as follows.

The preferential initial number of times of unitary use "m" of the storage medium 8 is calculated by the function $f_2(C, A, E_0)$ as follows:

$$m = A - E_0 \cdot C = 7{,}300 - 20 \times 30 = 6{,}700$$

Then the ratio X of m to Z is calculated by the function $f_3(m, Z)$ as follows:

$$X = m/Z = 6,700/20,000,000,000$$

Next the initial number P is calculated by the function $f_4(X, YT)$ as follows:

$$P = X \cdot YT = 6,700/20,000,000,000 \times 12,000,000,000 = 4,000$$

Finally the premium "α" is added to the above value.

Thus the larger the YT is, the larger the P is. The more rapidly the YT increases, the more rapidly the P increases.

As described above, with the operating system 20A, 20B, or 20C, service providers can recover their investments earlier and users can use their services inexpensively.

The advantage offered by the first feature of the invention is mainly that the initial available numbers of times of unitary use of prepaid available number-of-times-of-unitary-use storage media purchased during the time period of their advance sale are set higher than those of storage media purchased after the advance sale; therefore users are induced to buy storage media earlier, enabling the service provider to recover its investment earlier and the users themselves to make use of the service inexpensively.

The advantage offered by the second feature of the invention is mainly that the initial available numbers of times of unitary use of prepaid available number-of-times-of-unitary-use storage media purchased after their advance sale are set in a way such that the earlier the purchase dates and times of the storage media are, the larger the initial numbers of the storage media are; therefore users are induced to buy storage media earlier, enabling the service provider to recover its investment earlier and the users themselves to make use of the service inexpensively.

The advantage offered by the third feature of the invention is mainly that one and the same initial available number of times of unitary use is given to all prepaid available number-of-times-of-unitary-use storage media purchased during the time period of their advance sale; therefore users have no reason to rush upon the opening of the advance sale, distributing the information-processing load in the operating system over the time period of the advance sale.

The advantage offered by the fourth feature of the invention is mainly as follows. With the first function $f_1(DT)$, the number of days C from the closing date and time of the advance sale to the purchase date and time DT of each prepaid available number-of-times-of-unitary-use storage medium can be calculated. With the second function $f_2(C, A, E_0)$, the preferential initial number of times of unitary use m at the purchase date and time DT of said storage medium can be calculated based on C, the most preferential initial number of times of unitary use A, and the toll $E_0$ of the service. With the third function $f_3(m, Z)$, the ratio X of m of said storage medium to the annual sales target Z of the storage media can be calculated. With the fourth function $f_4(X, YT)$, the initial available number of times of unitary use of said storage medium can be calculated based on X of said storage medium and the sales YT from the opening day of the advance sale to DT of said storage media. Therefore the initial available number of times of unitary use of each storage medium can be set based on the annual sales target Z.

The advantage offered by the fifth feature of the invention is mainly that the initial value-setting system for setting the initial available numbers of times of unitary use of prepaid available number-of-times-of-unitary-use storage media can be computerized.

The advantage offered by the sixth feature of the invention is mainly as follows. The purchase-application data for a prepaid available number-of-times-of-unitary-use storage medium is inputted through a purchase-application-data input device and transmitted to the initial value-setting device through a communication network. The initial available number of times of unitary use of the storage medium is set based on the data by the initial value-setting device and transmitted to a writing device through the communication network. The writing device writes the initial number into the storage medium. Each time the holder of the storage medium makes use of the service, a rewriting device rewrites the remaining available number of times of unitary use in the storage medium. Thus prepaid available number-of-times-of-unitary-use storage media can be operated, processed, and managed conveniently.

The advantage offered by the seventh feature of the invention is mainly as follows. The purchase-application data for a prepaid available number-of-times-of-unitary-use storage medium is inputted into a mobile communication terminal through its purchase-application-data input means and transmitted to the initial value-setting device through a communication network. The initial available number of times of unitary use of the storage medium is set based on the data by the initial value-setting device and transmitted to the writing means of the mobile communication terminal through the communication network. The writing means writes the number into the storage medium in the mobile communication terminals. Each time the holder of the storage medium makes use of the service, the rewriting device rewrites the remaining available number of times of unitary use in the storage medium. Thus prepaid available number-of-times-of-unitary-use storage media can be operated, processed, and managed conveniently.

The advantage offered by the eighth feature of the invention is mainly as follows. The purchase-application data for a prepaid available number-of-times-of-unitary-use storage medium is inputted into a information-processing terminal through its purchase-application-data input means and transmitted to the initial value-setting device through a communication network. The initial available number of times of unitary use for the storage medium is set based on the data by the initial value-setting device and transmitted to the writing means of the information-processing terminal through the communication network. The writing means writes the initial number into the storage medium in the data-processing terminal. Each time the holder of the storage medium make use of the service, the rewriting device rewrites the remaining available number of times of unitary use in the storage medium. Thus prepaid available number-of-times-of-unitary-use storage media can be operated, processed, and managed conveniently.

The advantage offered by the ninth feature of the invention is mainly that the storage area of available number of times of unitary use of the prepaid available number-of-times-of-unitary-use storage medium is rewritable; therefore each time the holder of a unit of the storage medium makes use of the service, the available number stored in the user's storage medium can be rewritten.

The invention claimed is:

1. An initial value-setting system for setting the initial available numbers of times of unitary use of prepaid available number-of-times-of-unitary-use storage media for a plurality of users who make use of a certain toll or pay service, the initial value-setting system comprising:

a means for receiving purchase-application data on each medium including its purchase date and time through a communication network, a storage area storing the opening date and time of advance sale of the media, a storage area storing the closing date and time of the advance sale, a storage area storing the closing date and time of ordinary sale, as distinct from the advance sale, of the media, and a storage area storing a target annual sales of the media, a storage area storing a selling price of the media, a storage area storing a toll expressed in a number of times of unitary use of the service, a storage area storing a most preferential initial number of times of unitary use applicable to media purchased during the advance sale, and a storage area storing sales to date from the opening date and time of the advance sale to the purchase date and time of each medium, an initial value-setting means for setting the initial numbers of media with purchase dates and times between the opening and closing dates and times of the advance sale higher than those of media with purchase dates and times between the closing dates and times of the advance and ordinary sales the initial value-setting means having:

a function $f_1$ to calculate the number of days from the closing date and time of the advance sale to the purchase date and time of each media, a function $f_2$ to calculate a preferential initial number of times of unitary use at the purchase date and time of said medium based on the number of days, the most preferential initial number of times of unitary use, and the toll, a function $f_4$ to a function $f_3$ to calculate the ratio of the preferential initial number of times of unitary use of said medium to the target annual sales of the media, and calculate the final initial number of times of unitary use for said medium based on the ratio and the sales at the purchase date and time of said medium, wherein the sales to date comprise total sales to the plurality of users, and wherein the larger the total sales to date is, the larger the initial number of times of unitary use is set, and the more the total sales to date increases, the more the initial number of times of unitary use increases.

2. An initial value-setting system as claimed in claim 1 of which the initial value-setting means sets the initial numbers of media with purchase dates and times between the closing dates and times of the advance sale in a way such that the earlier the purchase dates and times of the media are, the larger the initial numbers of the media are.

3. An initial value-setting system as claimed in claim 1 of which the initial value-setting means sets the same number for all media with purchase dates and times between the opening and closing dates and times of the advance sale.

4. An initial value-setting device which is a computer and provided with the initial value-setting system according to claim 1, 2, or 3.

5. An operating system of prepaid available number-of-times-of-unitary-use storage media for a plurality of users who make use of a certain toll or pay service comprising:

the initial value-setting device according to claim 4 which sets the initial available numbers of times of unitary use of the media and has a means for transmitting the initial numbers, purchase-application-data input devices each to input and transmit purchase-application data on each medium to the initial value-setting device through a communication network N, writing devices each to receive the initial number of each medium from the initial value-setting device through the communication network N and write the initial number in said medium, and rewriting devices each to rewrite the remaining available number of times of unitary use of said user's medium every time each user makes use of the service.

6. An operating system of prepaid available number-of-times-of-unitary-use storage media for a plurality of users who make use of a certain toll or pay service comprising:

(i) the initial value-setting device according to claim 4 which sets the initial numbers of times of unitary use of the media and has a means for transmitting the initial number, (ii) mobile communication terminals each including a means for inputting purchase-application data on a medium, a means for transmitting the purchase-application data on the medium to the initial value-setting device through a communication network, a means for receiving the initial number of the medium from the initial value-setting device through the communication network, and a means for writing the initial number in the medium, and (iii) a rewriting device to rewrite the remaining available number of times of unitary use of said user's medium every time each user makes use of the service.

7. An operating system of prepaid available number-of-times-of-unitary-use storage media for a plurality of users who make use of a certain toll or pay service comprising:

(i) the initial value-setting device according to claim 4 which sets the initial numbers of times of unitary use of the media and has a means for transmitting the initial number, (ii) information-processing terminals each including a means for inputting purchase-application data on a medium, a means for transmitting the purchase-application data on the medium to the initial value-setting device through a communication network, a means for receiving the initial number of the medium from the initial value-setting device through the communication network, and a means for writing the initial number in the medium, and (iii) a rewriting device 4 to rewrite the remaining available number of times of unitary use of said user's medium every time each user makes use of the service.

8. An initial value-setting system for setting the initial available numbers of times of unitary use of prepaid available number-of-times-of-unitary-use storage media for a plurality of users who make use of a certain toll or pay service, the initial value-setting system comprising:

a device for receiving purchase-application data on each medium including its purchase date and time through a communication network, a storage area storing the opening date and time of advance sale of the media, a storage area storing the closing date and time of the advance sale, a storage area storing the closing date and time of ordinary sale, as distinct from the advance sale, of the media, and a storage area storing a target annual sales of the media, a storage area storing a selling price of the media, a storage area storing a toll expressed in a number of times of unitary use of the service, a storage area storing a most preferential initial number of times of unitary use applicable to media purchased during the advance sale, and a storage area storing sales to date from the opening date and time of the advance sale to the purchase date and time of each medium, an initial value-setting device for setting the initial numbers of media with purchase dates and times between the opening and closing dates and times of the advance sale higher than those of media with purchase dates and times between the closing dates and times of the advance and ordinary sales, the initial value-setting device having:

a function $f_1$ to calculate the number of days from the closing date and time of the advance sale to the purchase date and time of each media, a function $f_2$ to calculate a preferential initial number of times of unitary use at the purchase date and time of said medium based on the number of days, the most preferential initial number of times of unitary use, and the toll, a function $f_3$ to calculate the ratio of the preferential initial number of times of unitary use of said medium to the target annual sales of the media, and a function $f_4$ to calculate the final initial number of times of unitary use for said medium based on the ratio and the sales at the purchase date and time of said medium, wherein the sales to date comprise total sales to the plurality of users, and wherein the larger the total sales to date is, the larger the initial number of times of unitary use is set, and the more the total sales to date increases, the more the initial number of times of unitary use increases.

* * * * *